(12) United States Patent
Lin et al.

(10) Patent No.: US 9,599,870 B2
(45) Date of Patent: Mar. 21, 2017

(54) DISPLAY PANEL AND CURVED DISPLAY

(71) Applicant: AU Optronics Corp., Hsin-Chu (TW)

(72) Inventors: Gang-Yi Lin, Hsin-Chu (TW); Ya-Ling Hsu, Hsin-Chu (TW); Yu-Ching Wu, Hsin-Chu (TW); Hao-Wen Cheng, Hsin-Chu (TW); Chen-Hsien Liao, Hsin-Chu (TW); Wen-Hao Hsu, Hsin-Chu (TW); Pei-Chun Liao, Hsin-Chu (TW); Tien-Lun Ting, Hsin-Chu (TW); Jenn-Jia Su, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 100 days.

(21) Appl. No.: 14/801,838

(22) Filed: Jul. 17, 2015

(65) Prior Publication Data
US 2016/0026050 A1    Jan. 28, 2016

(30) Foreign Application Priority Data

Jul. 22, 2014   (TW) .............................. 103125182 A
May 19, 2015   (TW) .............................. 104115961 A

(51) Int. Cl.
G02F 1/1333   (2006.01)
G02F 1/1362   (2006.01)
G02F 1/1337   (2006.01)

(52) U.S. Cl.
CPC .. G02F 1/136286 (2013.01); G02F 1/133707 (2013.01); G02F 2001/136218 (2013.01); G02F 2001/136222 (2013.01)

(58) Field of Classification Search
CPC .. G02F 1/1333; G02F 1/1368; G02F 1/13439; G02F 1/133512
See application file for complete search history.

(56) References Cited

U.S. PATENT DOCUMENTS 7,649,602 B2   1/2010   Chen
7,749,783 B2   7/2010   Yang
(Continued)

FOREIGN PATENT DOCUMENTS

CN   1731259   2/2006
TW   201100938   1/2011
(Continued)

*Primary Examiner* — Timothy L Rude
(74) *Attorney, Agent, or Firm* — Locke Lord LLP; Tim Tingkang Xia, Esq.

(57) ABSTRACT

A display panel includes a first substrate, first gate lines, first data lines, second data lines, third data lines, fourth data lines, first sub-pixels, second sub-pixels and first shielding electrodes. The first substrate has a plurality of first sub-pixel regions and second sub-pixel regions. The first gate lines extend along a first direction. The first data lines, the second data lines, the third data lines and the fourth data lines extend along a second direction and are sequentially arranged in the first direction. The first sub-pixel is electrically connected to one of the first data line and the second data line. The second sub-pixel is electrically connected to one of the third data line and the fourth data line. The first shielding electrodes extend along the second direction and are disposed in a common boundary between the first sub-pixel region and the second sub-pixel region adjacent to each other.

30 Claims, 24 Drawing Sheets

(56) References Cited

U.S. PATENT DOCUMENTS

| | | |
|---|---|---|
| 2009/0027325 A1 | 1/2009 | Kim |
| 2010/0327284 A1 | 12/2010 | Liu |
| 2011/0128280 A1 | 6/2011 | Tseng |
| 2011/0317103 A1 | 12/2011 | Tseng |
| 2014/0264357 A1 | 9/2014 | Chen |
| 2015/0168793 A1* | 6/2015 | Oh .................. G02F 1/133707 349/110 |

FOREIGN PATENT DOCUMENTS

| | | |
|---|---|---|
| TW | 201120544 | 6/2011 |
| TW | 201200943 A1 | 1/2012 |
| TW | 201409139 A | 3/2014 |

* cited by examiner

DISPLAY PANEL AND CURVED DISPLAY

BACKGROUND OF THE INVENTION

1. Field of the Invention

The present invention generally relates to a display panel and a curved display, and more particularly, to a display panel with low light leakage and a curved display with low light leakage.

2. Description of the Prior Art

A curved display is a display having a curved display surface. When viewers are watching the curved display, the distances between the curved display and the eyes of the viewers at every position are almost the same, and the viewers can view an image displayed on the central region or the peripheral region of left and right ends of the screen in nearly a right angle. Accordingly, there are no issues such as brightness deviation and color washout in the curved display compared to the flat display panel. In addition, the curved display can provide the visual effect similar to the three-dimensional visual images. Therefore, the cured display has become a prospect display product. However, the curved display is formed by bending the flat panel display by an external force, so that deviations of corresponding positions between the two substrates will be a problem which may induce the light leakage and further affect the display quality of the curved display.

SUMMARY OF THE INVENTION

It is one of the objectives of the present invention to provide a display panel with low light leakage and a curved display with low light leakage.

One of the embodiments of the present invention provides a display panel which includes a first substrate, a plurality of first gate lines, a plurality of first data lines, a plurality of second data lines, a plurality of third data lines, a plurality of fourth data lines, a plurality of first color filter patterns, a plurality of second color filter patterns, a plurality of first sub-pixels, a plurality of second sub-pixels, a plurality of first shielding electrodes, a second substrate, a common electrode and a display medium layer. The first substrate has a plurality of first sub-pixel regions and a plurality of second sub-pixel regions, wherein the first sub-pixel regions and the second sub-pixel regions are arranged alternately in a first direction in sequence. The first gate lines are disposed on the first substrate and extend along the first direction. The first data lines, the second data lines, the third data lines and the fourth data lines are sequentially disposed on the first substrate in sequence the first data line, the second data line, the third data line and the fourth data line orderly along the first direction, and extend along a second direction, wherein each of the plurality of the first data lines and each of the plurality of the second data lines are disposed in each of the plurality of the first sub-pixel regions, each of the plurality of the third data lines and each of the plurality of the fourth data lines are disposed in each of the plurality of the second sub-pixel regions, and each of the plurality of the second data lines and each of the plurality of the third data lines are disposed between each of the plurality of the first data lines and each of the plurality of the fourth data lines. The first color filter patterns are disposed on the first substrate and disposed respectively in the first sub-pixel regions. The second color filter patterns are disposed on the first substrate and disposed respectively in the second sub-pixel regions. The first sub-pixels are disposed in the first sub-pixel regions respectively, wherein the first sub-pixels are electrically connected with the first data line, the second data line or a combination thereof, and the first sub-pixel includes a first pixel electrode disposed on the first color filter pattern. The second sub-pixels are disposed in the second sub-pixel regions respectively, wherein the second sub-pixels are electrically connected with the third data line, the fourth data line or a combination thereof, and the second sub-pixel includes a second pixel electrode disposed on the second color filter pattern. The first shielding electrodes are disposed on the first substrate and extending along the second direction, wherein the first shielding electrodes are respectively disposed in a common boundary between the first sub-pixel region and the second sub-pixel region adjacent to each other, i.e. the first shielding electrodes are disposed in a common boundary between any one of the first sub-pixel regions and the adjacent second sub-pixel region. The first shielding electrode has a fixed voltage. The second substrate is disposed opposite to the first substrate. The common electrode is disposed on the second substrate. The display medium layer is disposed between the first substrate and the second substrate.

Another embodiment of the present invention provides a curved display which includes the above mentioned display panel and a frame. The above mentioned display panel is combined with the frame for forming a curved display surface having a curvature.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention to the skilled users in the technology of the present invention, preferred embodiments will be detailed as follows. The preferred embodiments of the present invention are illustrated in the accompanying drawings with numbered elements to elaborate the contents and effects to be achieved.

Figure 1:
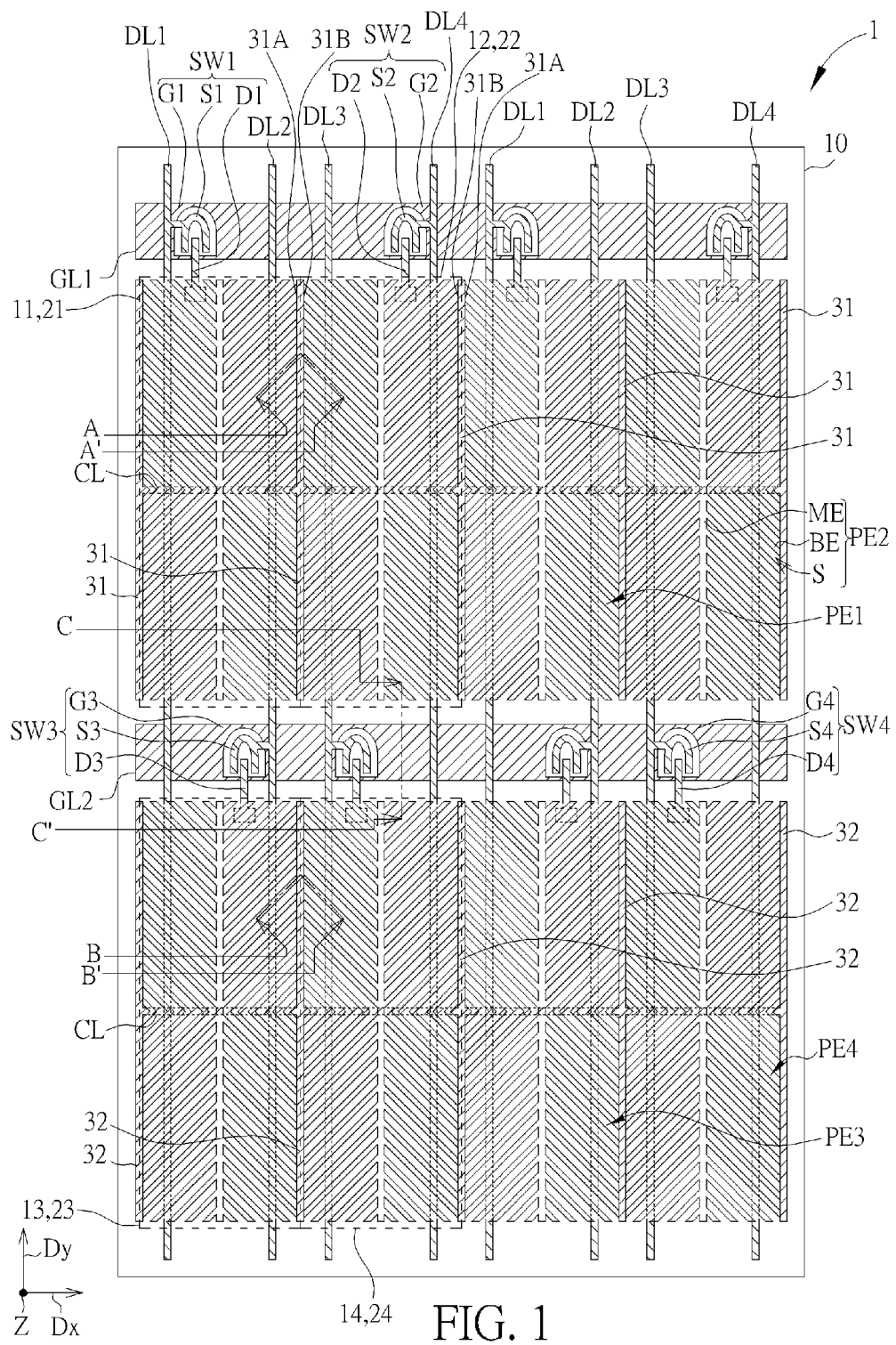
FIG. 1 is a schematic diagram illustrating a display panel according to a first embodiment of the present invention.
Figure 2:
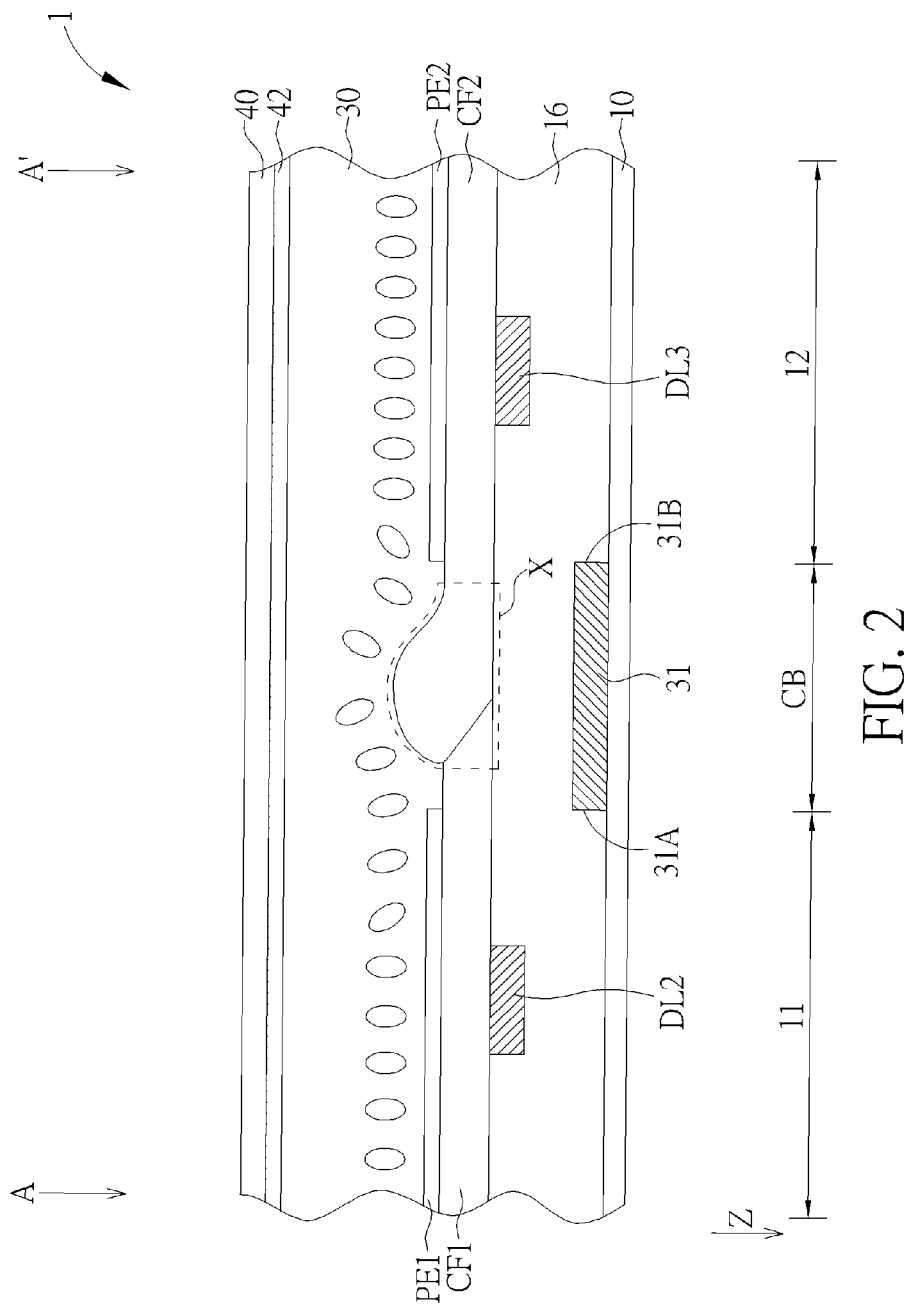
FIG. 2 is a schematic diagram illustrating a cross-sectional view of the display panel taken along a line A-A' in FIG. 1.
Figure 3:
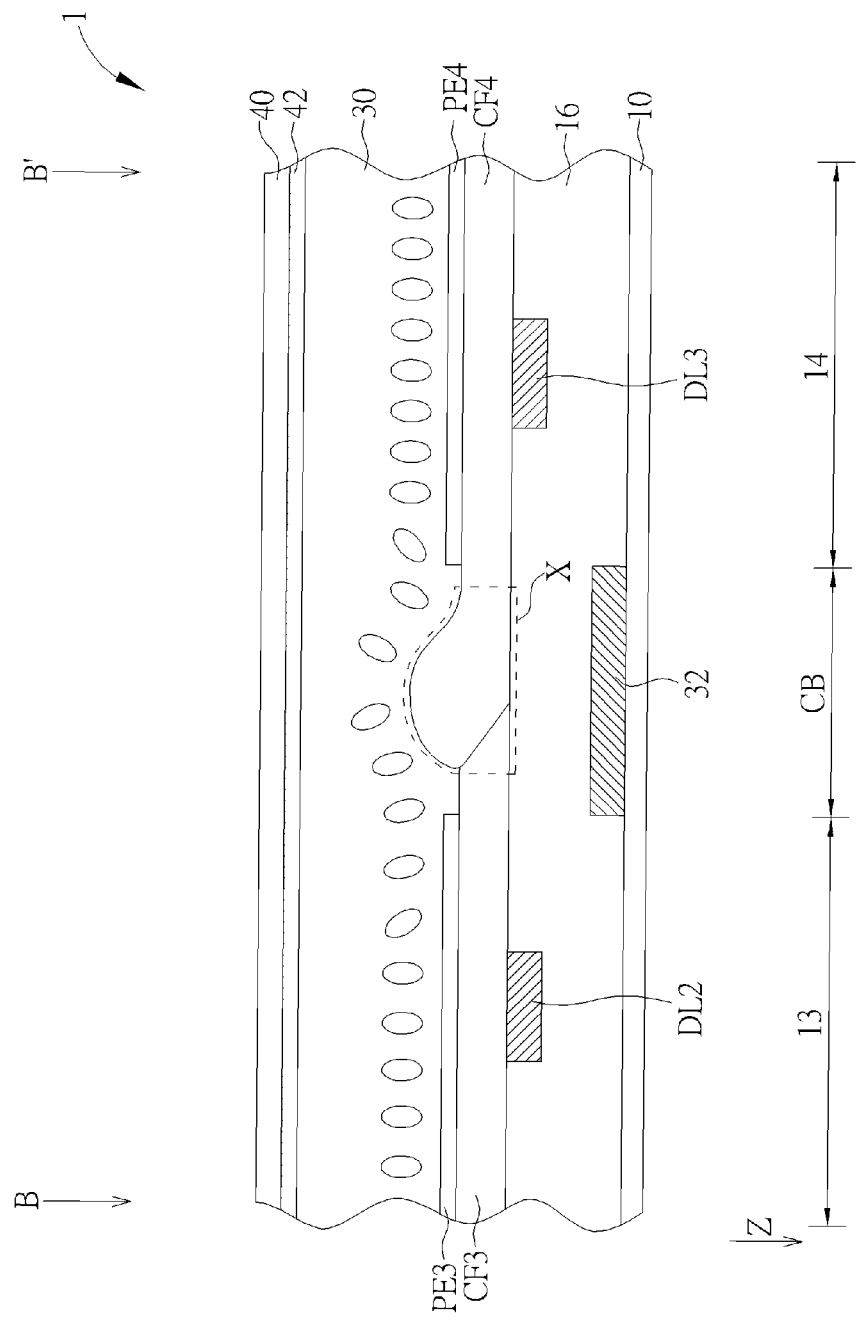
FIG. 3 is a schematic diagram illustrating a cross-sectional view of the display panel taken along a line B-B' in FIG. 1.
Figure 4:
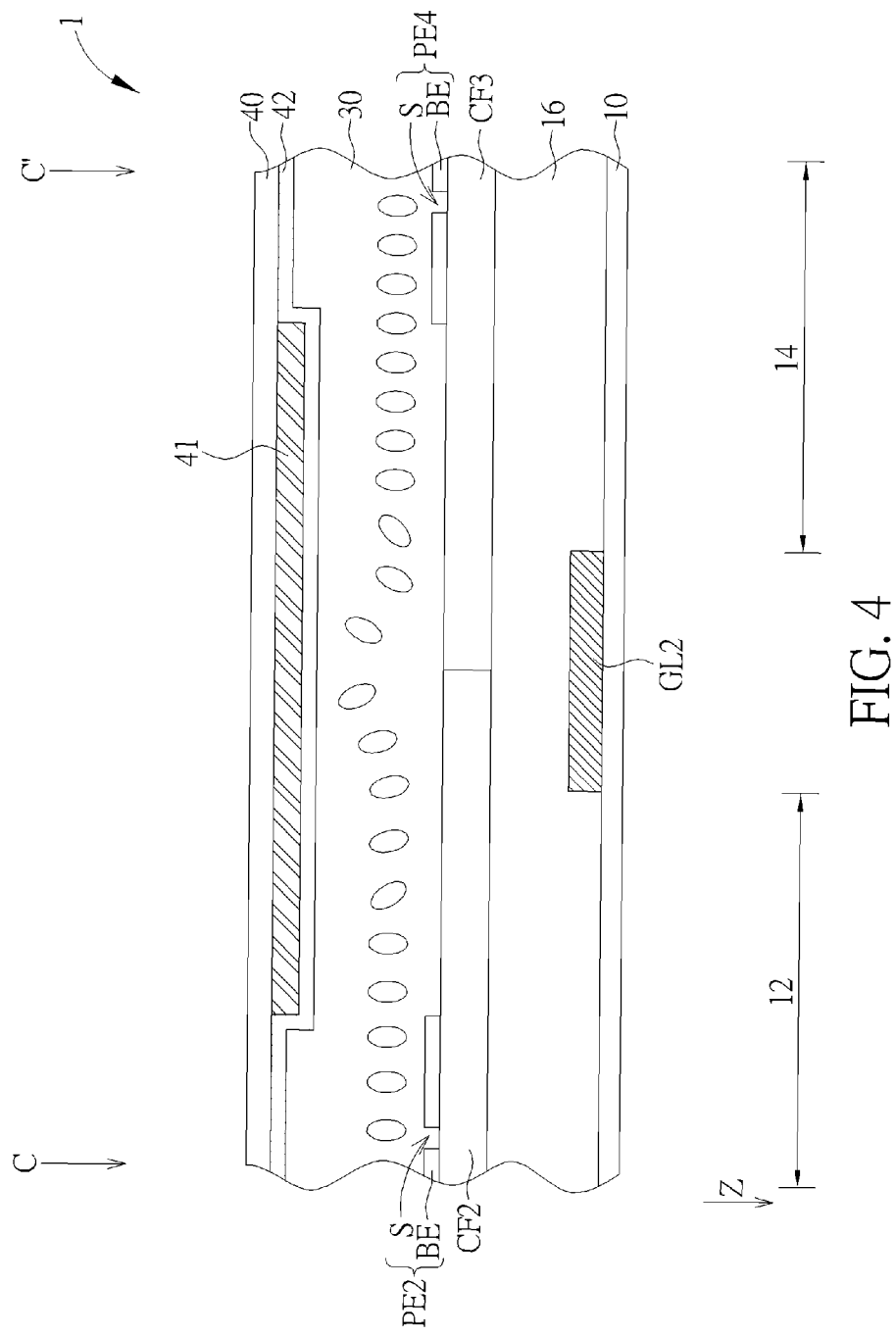
FIG. 4 is a schematic diagram illustrating a cross-sectional view of the display panel taken along a line C-C' in FIG. 1.

Please refer to FIGS. 1-4. FIG. 1 is a schematic diagram illustrating a display panel according to a first embodiment of the present invention, FIG. 2 is a schematic diagram illustrating a cross-sectional view of the display panel taken along line A-A' in FIG. 1, FIG. 3 is a schematic diagram illustrating a cross-sectional view of the display panel taken along line B-B' in FIG. 1, and FIG. 4 is a schematic diagram illustrating a cross-sectional view of the display panel taken along line C-C' in FIG. 1. For emphasizing the main features of the display panel of this embodiment, elements such as a color filter pattern, a second substrate, a common electrode, and a display medium layer are not shown in FIG. 1. As shown in FIGS. 1-4, a display panel 1 of this embodiment includes a first substrate 10, a plurality of first gate lines GL1, a plurality of first data lines DL1, a plurality of second data lines DL2, a plurality of third data lines DL3, a plurality of fourth data lines DL4, a plurality of first color filter patterns CF1, a plurality of second color filter patterns CF2, a plurality of first sub-pixels 21, a plurality of second sub-pixels 22, a plurality of first shielding electrodes 31, a second substrate 40, a common electrode 42 and a display medium layer 30. The first substrate 10 has a plurality of first sub-pixel regions 11 and a plurality of second sub-pixel regions 12, wherein the first sub-pixel regions 11 and the second sub-pixel regions 12 are arranged alternately in a first direction Dx in sequence. The first direction Dx is a direction of a horizontal axis of FIG. 1 in this embodiment, but not limited thereto. The second substrate 40 is disposed opposite to the first substrate 10. The first substrate 10 and the second substrate 40 may respectively include a transparent substrate such as a glass substrate or a plastic substrate, but not limited thereto. In addition, if the first substrate 10 and the second substrate 40 are applied to a curved display, then the first substrate 10 and the second substrate 40 may preferably be a flexible substrate or a transformable substrate. The common electrode 42 is disposed on the second substrate 40, for example on a surface of the second substrate 40 facing the first substrate 10, and the common electrode 42 has a common voltage. The common electrode 42 may include a transparent electrode, and the materials of the transparent electrode may include indium tin oxide (ITO), indium zinc oxide (IZO) or other suitable conductive materials. A liquid crystal display panel is used as an example for the display panel 1 of this embodiment, and therefore the display medium layer 30 is a liquid crystal layer disposed between the first substrate 10 and the second substrate 40. The first gate line GL1 is disposed on the first substrate 10 and extends along the first direction Dx. In this embodiment, the first gate line GL1 is disposed at one side of the first sub-pixel region 11 and the second sub-pixel region 12, the upper side of the first sub-pixel region 11 and the second sub-pixel region 12 in FIG. 1 for example, but not limited thereto. For instance, the first gate line GL1 may also be disposed at the lower side of the first sub-pixel region 11 and the second sub-pixel region 12. The data lines are sequentially disposed on the first substrate 10 in sequence the first data line DL1, the second data line DL2, the third data line DL3 and the fourth data line DL4 orderly along the first direction Dx and extend along the second direction Dy. For example, the first data line DL1, the second data line DL2, the third data line DL3 and the fourth data line DL4 are sequentially disposed from left to right along the first direction Dx. The second direction Dy is a direction of a longitudinal axis of FIG. 1 in this embodiment, but not limited thereto. The first data line DL1 and the second data line DL2 are disposed in the first sub-pixel region 11, the third data line DL3 and the fourth data line DL4 are disposed in the second sub-pixel region 12, and the second data line DL2 and the third data line DL3 are disposed between the first data line DL1 and the fourth data line DL4.

The first color filter pattern CF1 is disposed on the first substrate 10 and disposed in the first sub-pixel region 11, and the second color filter pattern CF2 is disposed on the first substrate 10 and disposed in the second sub-pixel region 12. The first sub-pixel 21 is disposed in the first sub-pixel region 11, wherein the first sub-pixel 21 is electrically connected with at least one of the first data line DL1 or the second data line DL2, i.e. the first sub-pixel 21 is electrically connected with the first data line DL1, the second data line DL2 or a combination thereof. The first sub-pixel 21 includes a first switch element SW1 and a first pixel electrode PE1. The first switch element SW1 has a first gate electrode G1, a first source electrode S1 and a first drain electrode D1, wherein the first gate electrode G1 is electrically connected with the first gate line GL1, the first source electrode S1 is electrically connected with one of the first data line DL1 and the second data line DL2, and the first drain electrode D1 is electrically connected with the first pixel electrode PE1. The first pixel electrode PE1 is disposed on the first color filter pattern CF1. The second sub-pixel 22 is disposed in the second sub-pixel region 12, wherein the second sub-pixel 22 is electrically connected with at least one of the third data line DL3 or the fourth data line DL4, i.e. the second sub-pixel 22 is electrically connected with the third data line DL3, the fourth data line DL4 or a combination thereof. The second sub-pixel 22 includes a second switch element SW2 and a second pixel electrode PE2. The second switch element SW2 has a second gate electrode G2, a second source electrode S2 and a second drain electrode D2, wherein the second gate electrode G2 is electrically connected with the first gate line GL1, the second source electrode S2 is electrically connected with one of the third data line DL3 and the fourth data line DL4, and the second drain electrode D2 is electrically connected with the second pixel electrode PE2. The second pixel electrode PE2 is disposed on the second color filter pattern CF2.

In this embodiment, the first substrate 10 may further have a plurality of the third sub-pixel region 13 and a plurality of the fourth sub-pixel region 14, wherein the third sub-pixel region 13 and the fourth sub-pixel region 14 are alternately arranged in the first direction Dx in sequence, the third sub-pixel regions 13 are respectively adjoining to the first sub-pixel region 11 in the second direction Dy, and the fourth sub-pixel regions 14 are respectively adjoining to the second sub-pixel region 12 in the second direction Dy. In another aspect, one first sub-pixel region 11, one second sub-pixel region 12, one third sub-pixel region 13 and one fourth sub-pixel region 14 are arranged to be a 2*2 matrix. Specifically, the first sub-pixel regions 11 and the second sub-pixel regions 12 are arranged alternately and repeatedly in the odd-numbered rows along the first direction Dx, and the third sub-pixel regions 13 and the fourth sub-pixel regions 14 are arranged alternately and repeatedly in even-numbered rows along the first direction Dx. In addition, the display panel 1 in this embodiment further includes a plurality of second gate lines GL2, a plurality of third color filter patterns CF3, a plurality of fourth color filter patterns CF4, a plurality of third sub-pixels 23, a plurality of fourth sub-pixels 24 and a plurality of second shielding electrodes 32. The second gate line GL2 is disposed on the first substrate 10 and extends along the first direction Dx, wherein the second gate line GL2 is disposed between the first sub-pixel region 11 and the third sub-pixel region 13 and disposed between the second sub-pixel region 12 and the fourth sub-pixel region 14. In addition, the first gate line GL1 and the second gate line GL2 may be formed by a patterned conductive layer such as a first metal layer, and the first data line DL1, the second data line DL2, the third data line DL3 and the fourth data line DL4 may be formed by another patterned conductive layer such as a second metal layer, but not limited thereto. At least one insulating layer 16 may be disposed between the first metal layer and the second metal layer. The third color filter pattern CF3 is disposed on the first substrate 10 and disposed in the third sub-pixel region 13, and the fourth color filter pattern CF4 is disposed on the first substrate 10 and disposed in the fourth sub-pixel region 14. The third sub-pixel 23 is disposed in the third sub-pixel region 13, and the third sub-pixel 23 includes a third switch element SW3 and a third pixel electrode PE3. The third switch element SW3 has a third gate electrode G3, a third source electrode S3 and a third drain electrode D3, wherein the third gate electrode G3 is electrically connected with the second gate line GL2, the third source electrode S3 is electrically connected with the other one of the first data line DL1 and the second data line DL2, and the third drain electrode D3 is electrically connected with the third pixel electrode PE3. The third pixel electrode PE3 is disposed on the third color filter pattern CF3. The fourth sub-pixel 24 is disposed in the fourth sub-pixel region 14, and the fourth sub-pixel 24 includes a fourth switch element SW4 and a fourth pixel electrode PE4. The fourth switch element SW4 has a fourth gate electrode G4, a fourth source electrode S4 and a fourth drain electrode D4, wherein the fourth gate electrode G4 is electrically connected with the second gate line GL2, the fourth source electrode S4 is electrically connected with the other one of the third data line DL3 and the fourth data line DL4, and the fourth drain electrode D4 is electrically connected with the fourth pixel electrode PE4. The fourth pixel electrode PE4 is disposed on the fourth color filter pattern CF4.

In this embodiment, the first source electrode S1 of the first switch element SW1 is electrically connected with the first data line DL1, the second source electrode S2 of the second switch element SW2 is electrically connected with the fourth data line DL4, the third source electrode S3 of the third switch element SW3 is electrically connected with the second data line DL2, and the fourth source electrode S4 of the fourth switch element SW4 is electrically connected with the third data line DL3, thereby the display panel 1 of this embodiment may support the dot inversion driving method, so as to reduce the flicker issue.

In this embodiment, each pixel electrode (including the first pixel electrode PE1, the second pixel electrode PE2, the third pixel electrode PE3 and the fourth pixel electrode PE4) includes a main electrode ME and a plurality of branch electrodes BE, wherein a slit S exists between the adjacent branch electrodes BE. The branch electrodes BE are electrically connected with the main electrode ME, and the branch electrodes BE extend toward different directions to form a plurality of alignment regions. For example, the main electrodes ME of this embodiment are all substantially cross-shaped, and one end of the branch electrodes BE is connected with the main electrode ME so as to define four alignment regions with different alignment directions. The material of the first pixel electrode PE1, the second pixel electrode PE2, the third pixel electrode PE3 and the fourth pixel electrode PE4 may be a transparent conductive material such as indium tin oxide (ITO), indium zinc oxide (IZO) or other suitable conductive materials. In this embodiment, the slits S of the pixel electrodes including the first pixel electrode PE1, the second pixel electrode PE2, the third pixel electrode PE3 and the fourth pixel electrode PE4 may have identical width i.e. equal-width slit design, but not limited thereto. In an alternative embodiment, the slits S may have unequal-width slit design, e.g. the width of the slit S may gradually decrease or gradually increase from the main electrode ME, and the width variation of the slit S may be continuous variation, discrete variation or continuous-and-discrete variation.

The light leakage easily occurs at the common boundary CB between the first sub-pixel region 11 and the second sub-pixel region 12, especially when a protruding part X is formed at the common boundary CB between the first sub-pixel region 11 and the second sub-pixel region 12 because the first color filter pattern CF1 and the second color filter pattern CF2 are disposed stacking with each other. The liquid crystal molecules of the display medium layer 30 will be misaligned by the protruding part X, and the light leakage will become apparent accordingly. In order to solve the light leakage issue, the first shielding electrode 31 is disposed on the first substrate 10 and extends along the second direction Dy, wherein the first shielding electrode 31 is disposed at the common boundary CB between the first sub-pixel region 11 and the second sub-pixel region 12, and the first color filter pattern CF1 and the second color filter pattern CF2 overlap a portion of the first shielding electrode 31 in a vertical projection direction Z for shielding the light leaked around the protruding part X. In addition, the first shielding electrode 31 has a fixed voltage. For example, the fixed voltage may be the common voltage so that the fixed voltage may be the same as the common voltage on the common electrode 42, but not limited thereto. The first shielding electrode 31 has the fixed voltage which may shield the liquid crystal alignment condition from the influence of the horizontal electric field between any two adjacent data lines e.g. the liquid crystal alignment condition from the influence of the horizontal electric field between the first data line DL1 and the fourth data line DL4 and between the second data line DL2 and the third data line DL3. Accordingly, the liquid crystal molecules may remain standing to reduce the light leakage during the dark display state; as during the bright display state, the first shielding electrode 31 may be the common line or the common electrode because the first shielding electrode 31 has the fixed voltage such as the common voltage.

In this embodiment, the first pixel electrode PE1 overlaps at least a portion of the first data line DL1 and at least a portion of the second data line DL2 in the vertical projection direction Z within the first sub-pixel region 11, and the second pixel electrode PE2 overlaps at least a portion of the third data line DL3 and at least a portion of the fourth data line DL4 in the vertical projection direction Z within the second sub-pixel region 12. For example, a portion of the branch electrode BE and a portion of the slits S of the first pixel electrode PE1 partially overlap the first data line DL1 and the second data line DL2 in the vertical projection direction Z, and a portion of the branch electrode BE and a portion of the slits S of the second pixel electrode PE2 partially overlap the third data line DL3 and the fourth data line DL4 in the vertical projection direction Z. Accordingly, the first pixel electrode PE1 may shield the electric field between the first data line DL1/the second data line DL2 and the common electrode 42, and the second pixel electrode PE2 may shield the electric field between the third data line DL3/the fourth data line DL4 and the common electrode 42. In addition, the first pixel electrode PE1 may further extend toward the two first shielding electrodes 31 adjacent in the first direction Dx and protrude from the first data line DL1 and the second data line DL2 respectively, and the second pixel electrode PE2 may further extend toward the two first shielding electrodes 31 adjacent in the first direction Dx and protrude from the third data line DL3 and the fourth data line DL4 respectively. For example, in this embodiment, each of the first shielding electrode 31 has a first edge 31A adjoining to the first pixel electrode PE1, and a second edge 31B adjoining to the second pixel electrode PE2, wherein the first pixel electrode PE1 is substantially aligned with the first edges 31A of the first shielding electrodes 31 adjacent in the first direction Dx respectively, and the second pixel electrode PE2 is substantially aligned with the second edges 31B of the first shielding electrodes 31 adjacent in the first direction Dx respectively. Specifically, a portion of the branch electrodes BE of the first pixel electrode PE1 is substantially aligned with the first edge 31A of one of the first shielding electrodes 31, and another portion of the branch electrodes BE of the first pixel electrode PE1 is substantially aligned with the first edge 31A of the other one of the first shielding electrodes 31; a portion of the branch electrodes BE of the second pixel electrode PE2 is substantially aligned with the second edge 31B of one of the first shielding electrodes 31, and another portion of the branch electrodes BE of the second pixel electrode PE2 is substantially aligned with the second edge 31B of the other one of the first shielding electrodes 31. The first pixel electrode PE1 protrudes from the first data line DL1 and the second data line DL2 and is at least substantially aligned with the first edges 31A of the first shielding electrodes 31 respectively, and the second pixel electrode PE2 protrudes from the third data line DL3 and the fourth data line DL4 and is at least substantially aligned with the second edges 31B of the first shielding electrodes 31 respectively. Thereby, the region between the first edge 31A of the first shielding electrode 31 and the edge of the adjacent data line (e.g. the first data line DL1 or the second data line DL2) and the regions between and the second edge 31B of the first shielding electrode 31 and the edge of the adjacent data line (e.g. the third data line DL3 or the fourth data line DL4) are effective display regions. In another aspect, the first pixel electrode PE1 may drive the liquid crystal molecules in the region between the edge of the first data line DL1 (or the second data line DL2) and the first edge 31A of the first shielding electrode 31 normally to provide the displayed image, and the second pixel electrode PE2 may drive the liquid crystal molecules in the region between the edge of the third data line DL3 (or the fourth data line DL4) and the second edge 31B of the first shielding electrode 31 to provide the displayed image, so as to increase the area of the effective display region. Furthermore, the second shielding electrode 32 is disposed on the first substrate 10 and extends along the second direction Dy, wherein the second shielding electrode 32 is disposed at the common boundary CB between the third sub-pixel region 13 and the fourth sub-pixel region 14 adjacent to each other to shield the light leaked from this region. The functions and features of the second shielding electrode 32 are the same as those of the first shielding electrode 31 and will not be redundantly described here. It is noteworthy that even though the edges of the pixel electrode and the shielding electrode are substantially aligned in this embodiment, the corresponding positions of the edges of the pixel electrode and the shielding electrode may be deviated due to the alignment deviation between the pixel electrode and the shielding electrode. For example, the edges of the pixel electrode and the shielding electrode may be regarded as substantially aligned when the alignment deviation ranges between −2 microns and 2 microns.

In addition, the display panel 1 of this embodiment may further include a plurality of common lines CL disposed along the first direction Dx on the first substrate 10, wherein one of the common lines CL is connected with the first shielding electrode 31, and another common line CL is connected with the second shielding electrode 32. What's more, the fixed voltage of the first shielding electrode 31 and the second shielding electrode 32 may be the common voltage provided by the common lines CL, but not limited thereto.

The display panel 1 of this embodiment may further include a plurality of light shielding patterns 41 disposed on the second substrate 40, wherein one of the light shielding patterns 41 overlaps the first gate line GL1 in the vertical projection direction Z for shielding the light leaked from the peripheral portion of the first gate line GL1; and another light shielding pattern 41 overlaps the second gate line GL2 in the vertical projection direction Z for shielding the light leaked from the peripheral portion of the second gate line GL2. If the display panel 1 of this embodiment is applied to the curved display, the second direction Dy will be the center axis of bending, thereby, the light shielding patterns 41 on the second substrate 40 will only deviate along the first direction Dx though the first substrate 10 and the second substrate 40 will shift correspondingly because of the difference in bending conditions, and the shielding effect on the peripheral portion of the first gate line GL1 and the peripheral portion of the second gate line GL2 will not be influenced accordingly.

Figure 5:
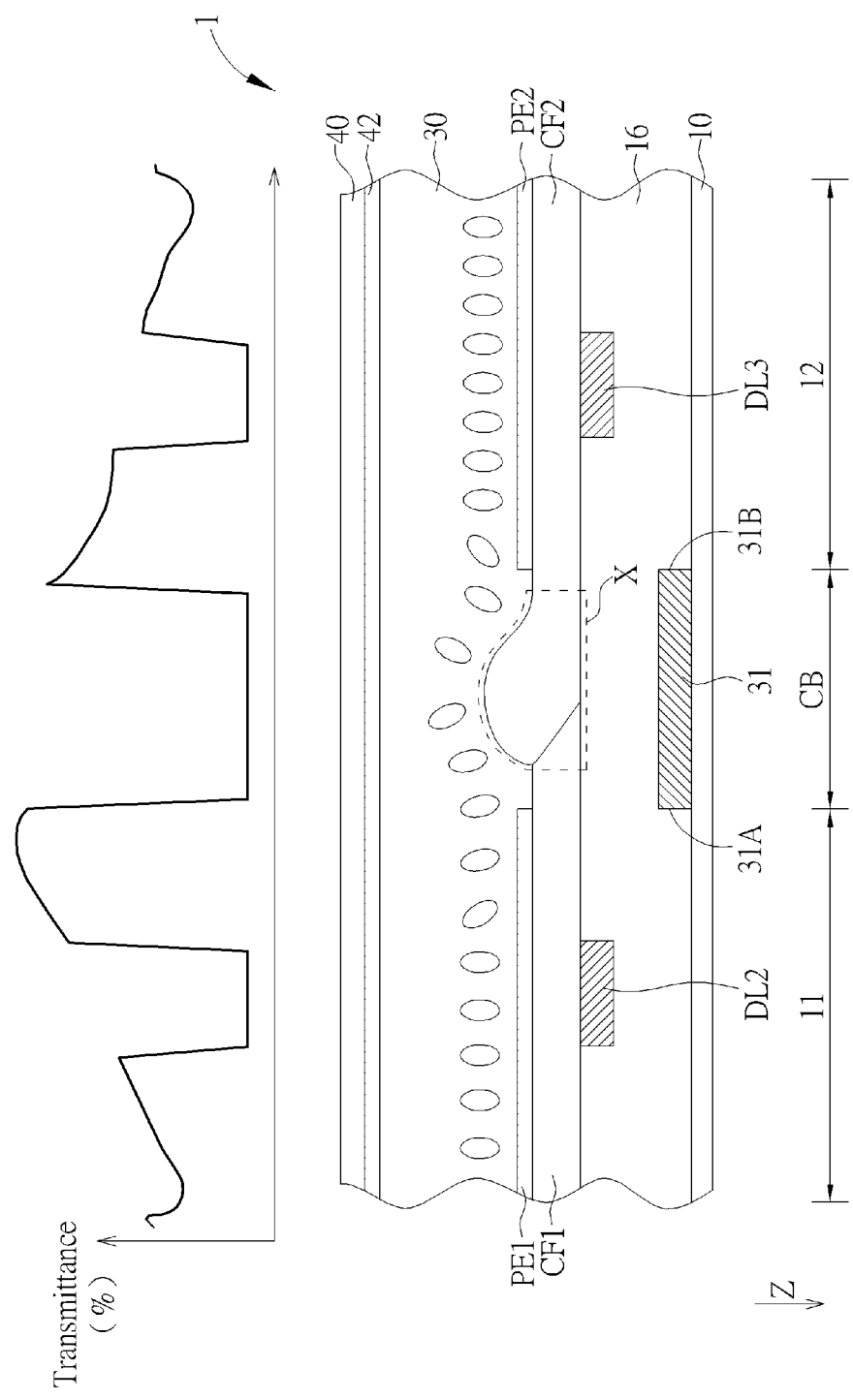
FIG. 5 is a schematic diagram illustrating a transmittance simulation of the display panel in a bright display state.
Figure 6:
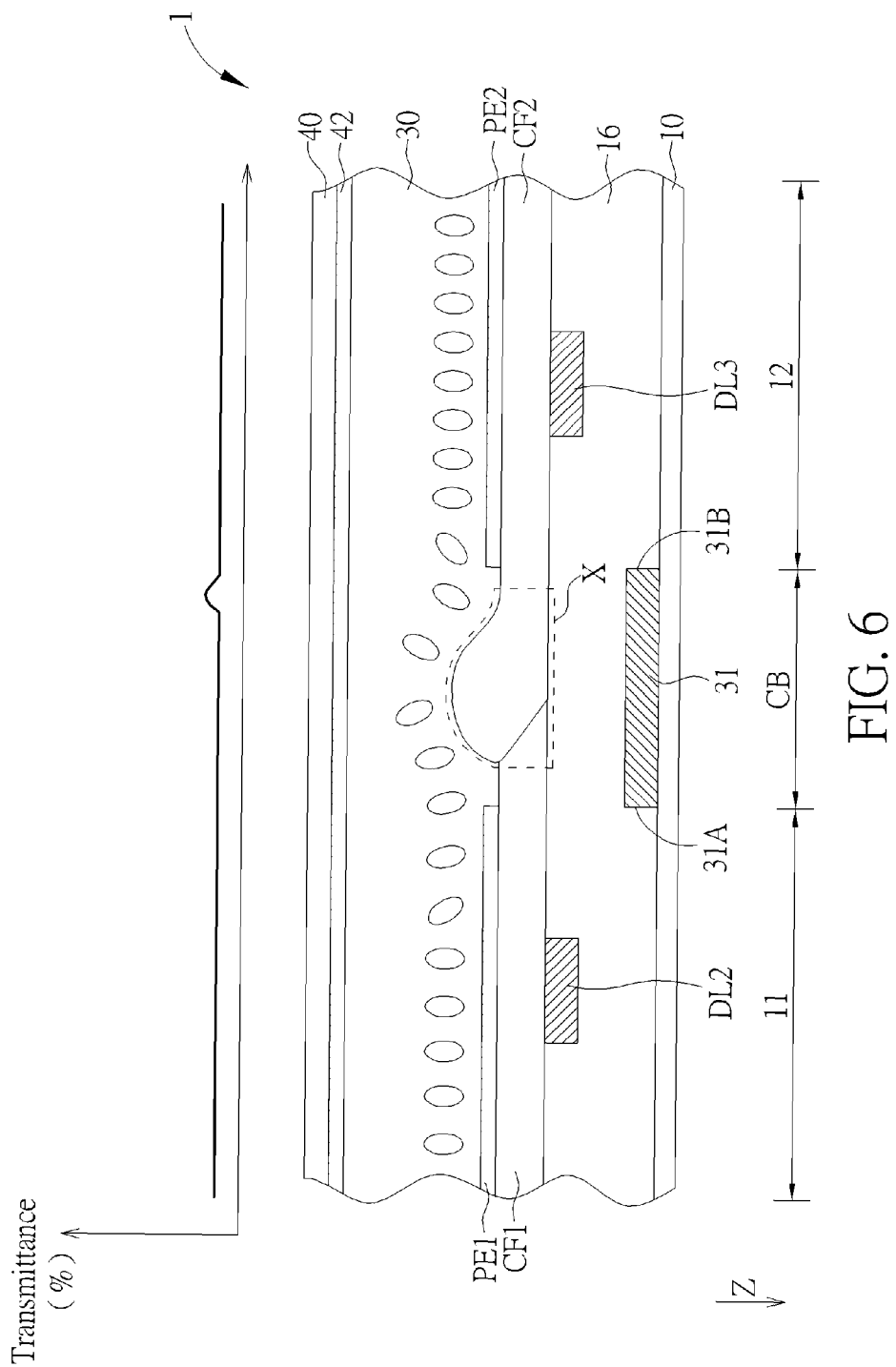
FIG. 6 is a schematic diagram illustrating a transmittance simulation of the display panel in a dark display state.
Figure 7A:
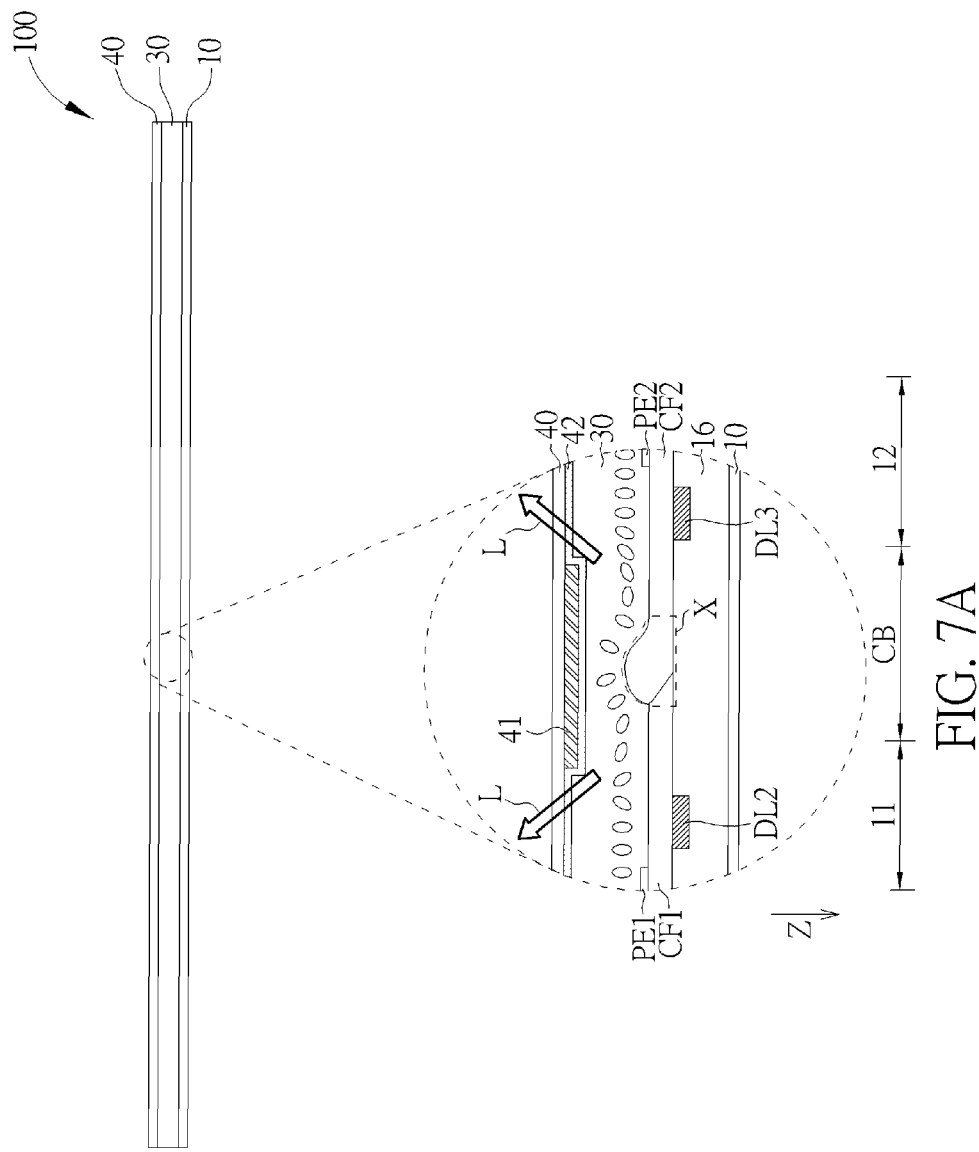
FIG. 7A is a schematic diagram illustrating a display panel under an unbending situation according to a compared embodiment of the present invention.
Figure 7B:
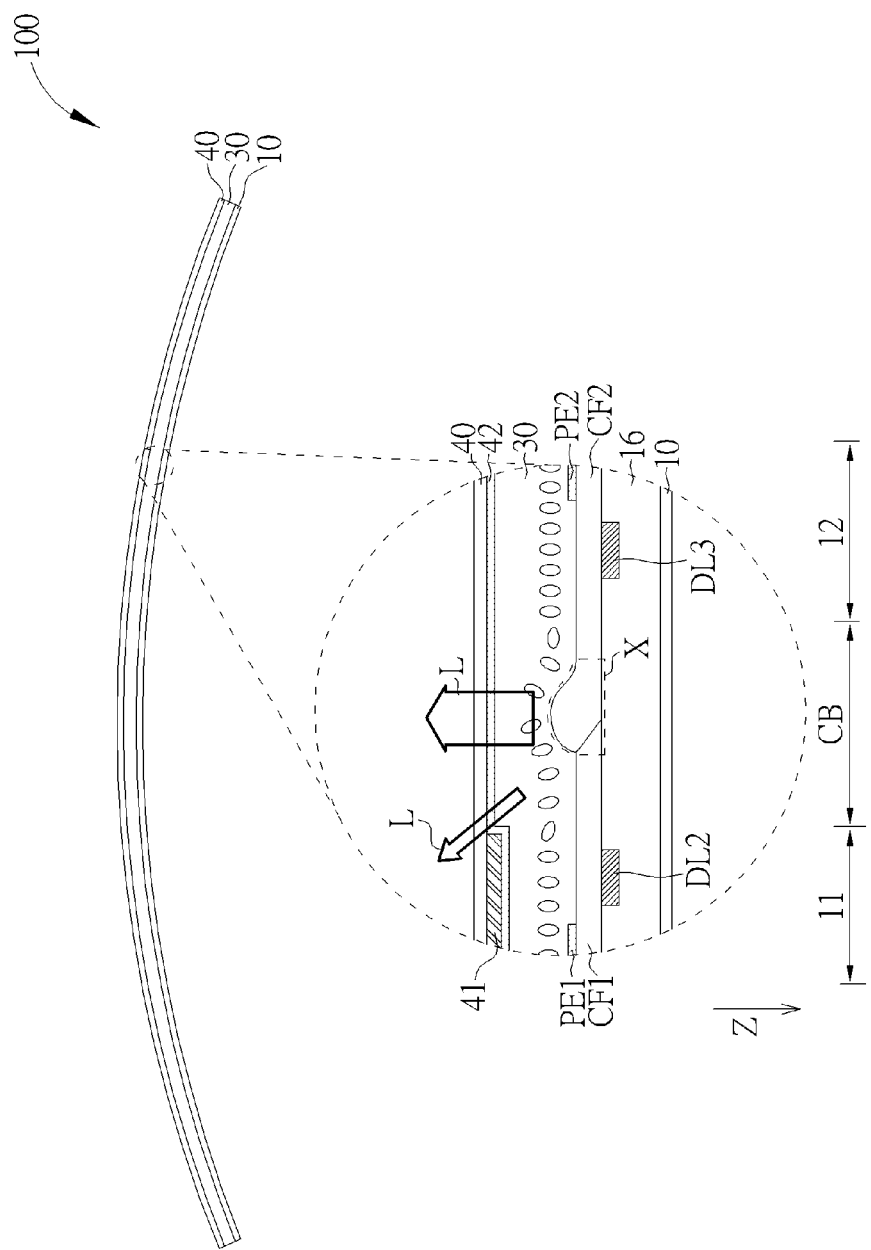
FIG. 7B is a schematic diagram illustrating the display panel under a bending situation according to the compared embodiment of the present invention.

Please refer to FIG. 5, FIG. 6, FIG. 7A and FIG. 7B. FIG. 5 is a schematic diagram illustrating a transmittance simulation of the display panel in a bright display state of this embodiment, FIG. 6 is a schematic diagram illustrating a transmittance simulation of the display panel in a dark display state of this embodiment, FIG. 7A is a schematic diagram illustrating a display panel under an unbending situation according to a compared embodiment, and FIG. 7B is a schematic diagram illustrating a display panel under a bending situation according to the compared embodiment. As shown in FIG. 5, the display panel 1 of this embodiment has been proved that during the bright display state, the region between the edge of the first data line DL1 or the second data line DL2 and the first edge 31A of the first shielding electrode 31 can provide displayed images effectively, the region of the edge of the third data line DL3 or the fourth data line DL4 and the second edge 31B of the first shielding electrode 31 can provide displayed images effectively, and the area of the effective display region can be increased. As shown in FIG. 6, the display panel 1 of this embodiment has been proved that during the dark display state, the light leakage is indeed prevented under the situation of the first shielding electrode 31 disposed at the common boundary CB between the first sub-pixel region 11 and the second sub-pixel region 12. According to the content mentioned above, in this embodiment, the leaked light can be effectively shielded by simply disposing the shielding electrodes (include the first shielding electrodes 31 and the second shielding electrodes 32) on the first substrate 10 corresponding to the regions between the two adjoining sub-pixel regions in the first direction Dx, and it is not necessary to dispose light shielding patterns (black matrix for example) on the second substrate 40. In addition, as shown in FIG. 7A, a light shielding pattern 41 (black matrix for example) is disposed between the second substrate 40 and the common electrode 42 in a display panel 100 of the compared embodiment, the light shielding pattern 41 is disposed corresponding to the common boundary CB between the first sub-pixel region 11 and the second sub-pixel region 12, and there are no shielding electrode disposed on the first substrate 10. In another aspect, the light shielding pattern 41 disposed on the second substrate 40 in the display panel 100 of the compared embodiment is used to shield the light leaked from the common boundary CB of the first sub-pixel region 11 and the second sub-pixel region 12. The light shielding pattern 41 will affect the flatness of the common electrode 42 when the display panel 100 of the compared embodiment is applied to the flat panel display and unbent, thereby, a light leakage L happens because of the misalignment of the liquid crystal molecules corresponding to the edge of the light shielding pattern 41. As shown in FIG. 7B, a relatively shift between the first substrate 10 and the second substrate 40 will occur due to the difference in bending conditions of the first substrate 10 and the second substrate 40 when the display panel 100 of the compared embodiment is applied to the curved display and bent. Under this situation, the light shielding pattern 41 on the second substrate 40 will shift and no longer be corresponding to the common boundary CB of the first sub-pixel region 11 and the second sub-pixel region 12, such as shift to the first sub-pixel region 11. During the dark display state, the light leakage does not only occur at the common boundary CB without shielding of the light shielding pattern 41, and the light leakage L also occurs within the first sub-pixel region 11 because of the misalignment of the liquid crystal molecules at the edge of the light shielding pattern 41. What's more, the shifting problem of the light shielding pattern 41 mentioned above may also occur when the first substrate 10 and the second substrate 40 are aligned inaccurately. According to FIG. 7A and FIG. 7B, the light shielding pattern 41 disposed on the second substrate 40 cannot shield the light leakage L whether the display panel is applied to the flat panel display or the curved display.

The display panel of the present invention is not limited to the above mentioned embodiment. The following description will detail the display panels of other preferable embodiments. To simplify the description, identical components in each of the following embodiments are marked with identical symbols. For making it easier to understand the differences between the embodiments, the following description will detail the dissimilarities among different embodiments and the identical features will not be redundantly described.

Figure 8:
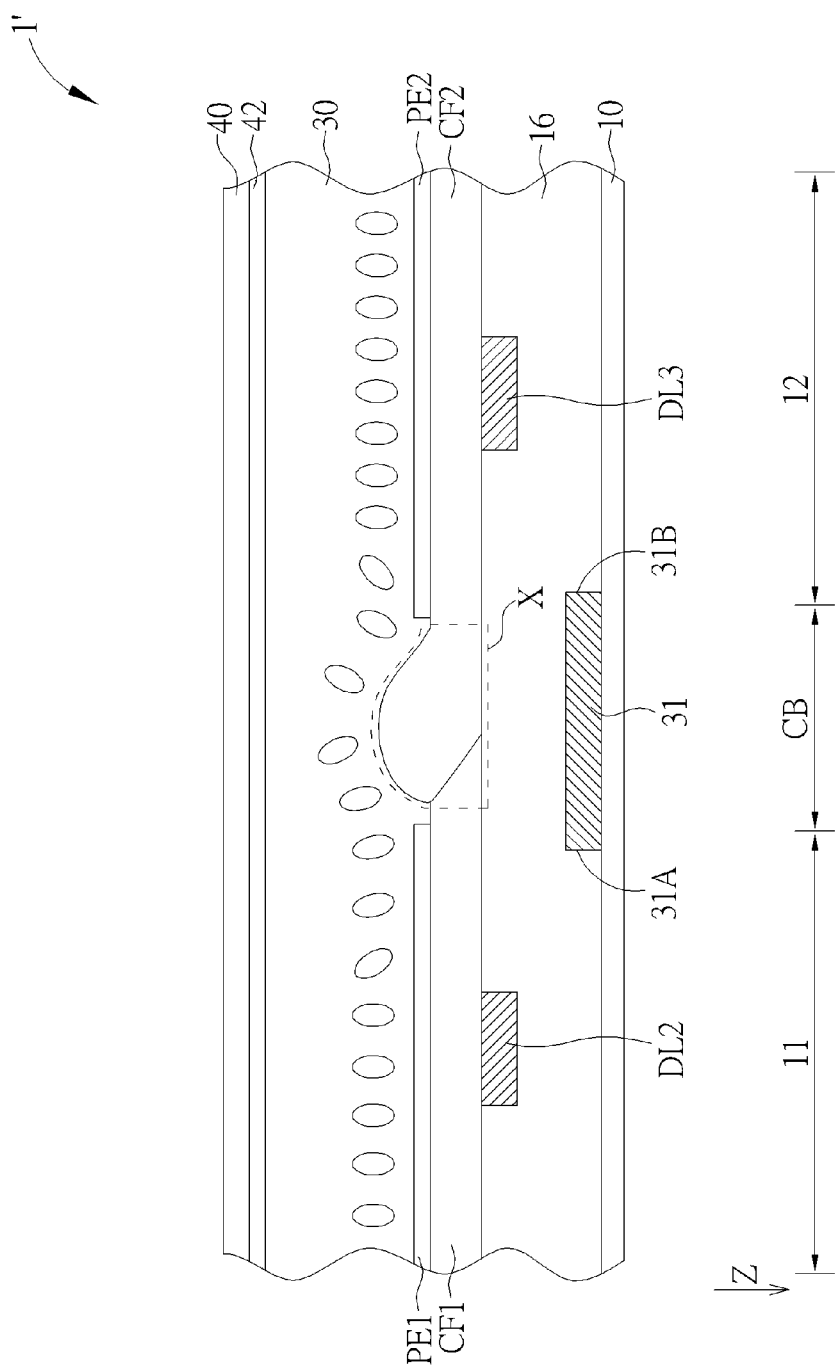
FIG. 8 is a schematic diagram illustrating a display panel according to a first alternative embodiment of the first embodiment of the present invention.

Please refer to FIG. 8. FIG. 8 is a schematic diagram illustrating a display panel according to a first alternative embodiment of the first embodiment. In a display panel 1' of the first alternative embodiment shown in FIG. 8, the first pixel electrode PE1 overlaps a portion of the two first shielding electrodes 31 adjacent in the first direction Dx in the vertical projection direction Z, and the second pixel electrode PE2 overlaps a portion of the two first shielding electrodes 31 adjacent in the first direction Dx in the vertical projection direction Z. For example, a portion of the branch electrodes BE and a portion of the slits S of the first pixel electrode PE1 partially overlap the first shielding electrode 31 disposed at one side in the vertical projection direction Z, another portion of the branch electrodes BE and another portion of the slits S of the first pixel electrode PE1 overlap the first shielding electrode 31 disposed at the other side in the vertical projection direction Z; a portion of the branch electrodes BE and a portion of the slits S of the second pixel electrode PE2 partially overlap the first shielding electrode 31 disposed at one side in the vertical projection direction Z, and another portion of the branch electrodes BE and another portion of the slits S of the second pixel electrode PE2 overlap the first shielding electrode 31 disposed at the other side in the vertical projection direction. The overlapping design between the first pixel electrode PE1 and the first shielding electrode 31 and the overlapping design between the second pixel electrode PE2 and the first shielding electrode 31 make sure that the region between the edge of the first data line DL1 (or the second data line DL2) and the first edge 31A of the first shielding electrode 31 and the region between the edge of the third data line DL3 (or the fourth data line DL4) and the second edge 31B of the first shielding electrode 31 are effective display regions. The width of the region where the first pixel electrode PE1 overlaps the first shielding electrode 31 and the width of the region where the second pixel electrode PE2 overlaps the first shielding electrode 31 may be modified according to the alignment deviation or other factors. For example, the width of the region where the first pixel electrode PE1 overlaps the first shielding electrode 31 and the width of the region where the second pixel electrode PE2 overlaps the first shielding electrode 31 may substantially and respectively range between 1 micron and 4 microns, such as 2 microns, but not limited thereto.

Figure 9:
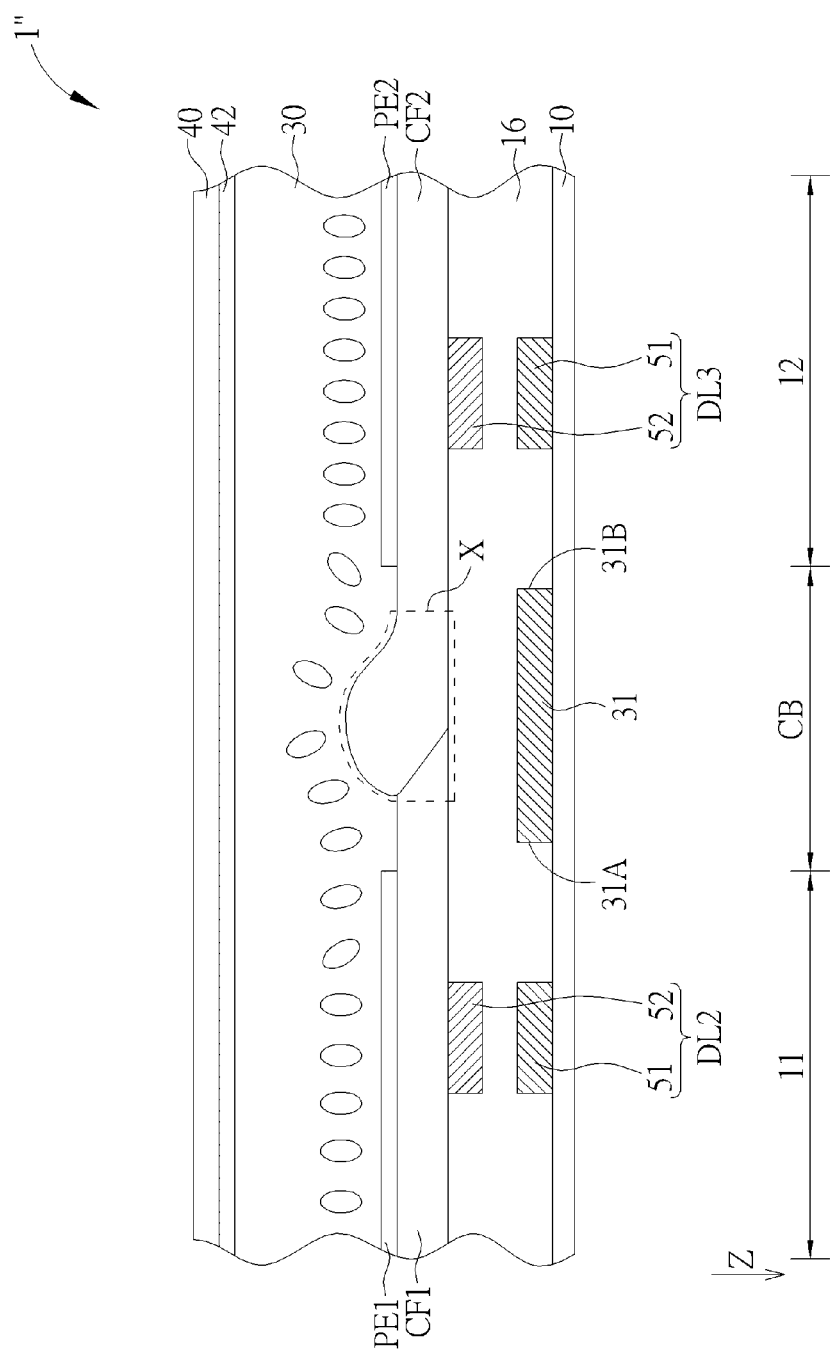
FIG. 9 is a schematic diagram illustrating a display panel according to a second alternative embodiment of the first embodiment of the present invention.

Please refer to FIG. 9. FIG. 9 is a schematic diagram illustrating a display panel according to a second alternative embodiment of the first embodiment. In a display panel 1" of the second alternative embodiment shown in FIG. 9, the data line is formed by stacking a plurality of patterned conductive layers. For example, the first data line DL1 may be formed by stacking a first patterned conductive layer 51 and a second patterned conductive layer 52. Specifically, an insulating layer 16 is disposed between the first patterned conductive layer 51 and the second patterned conductive layer 52, the insulating layer 16 has a plurality of contact holes (not shown), and the first patterned conductive layer 51 and the second patterned conductive layer 52 may connect electrically via the contact hole in the insulating layer 16. The first patterned conductive layer 51 may be a first metal layer used to form the first gate line GL1, the second gate line GL2 and the common line CL, thereby, the resistance of the first data line DL1 may be reduced without increasing extra processes. Similarly, a second data line DL2, a third data line DL3 and a fourth data line DL4 may also be formed by stacking the first patterned conductive layer 51 and the second patterned conductive layer 52. It is noteworthy that in the regions where the data lines cross the first gate line GL1, the second gate line GL2 and the common line CL, the first data line DL1, the second data line DL2, the third data line DL3 and the fourth data line DL4 may be formed simply by the second patterned conductive layer 52, but not limited thereto.

Figure 10:
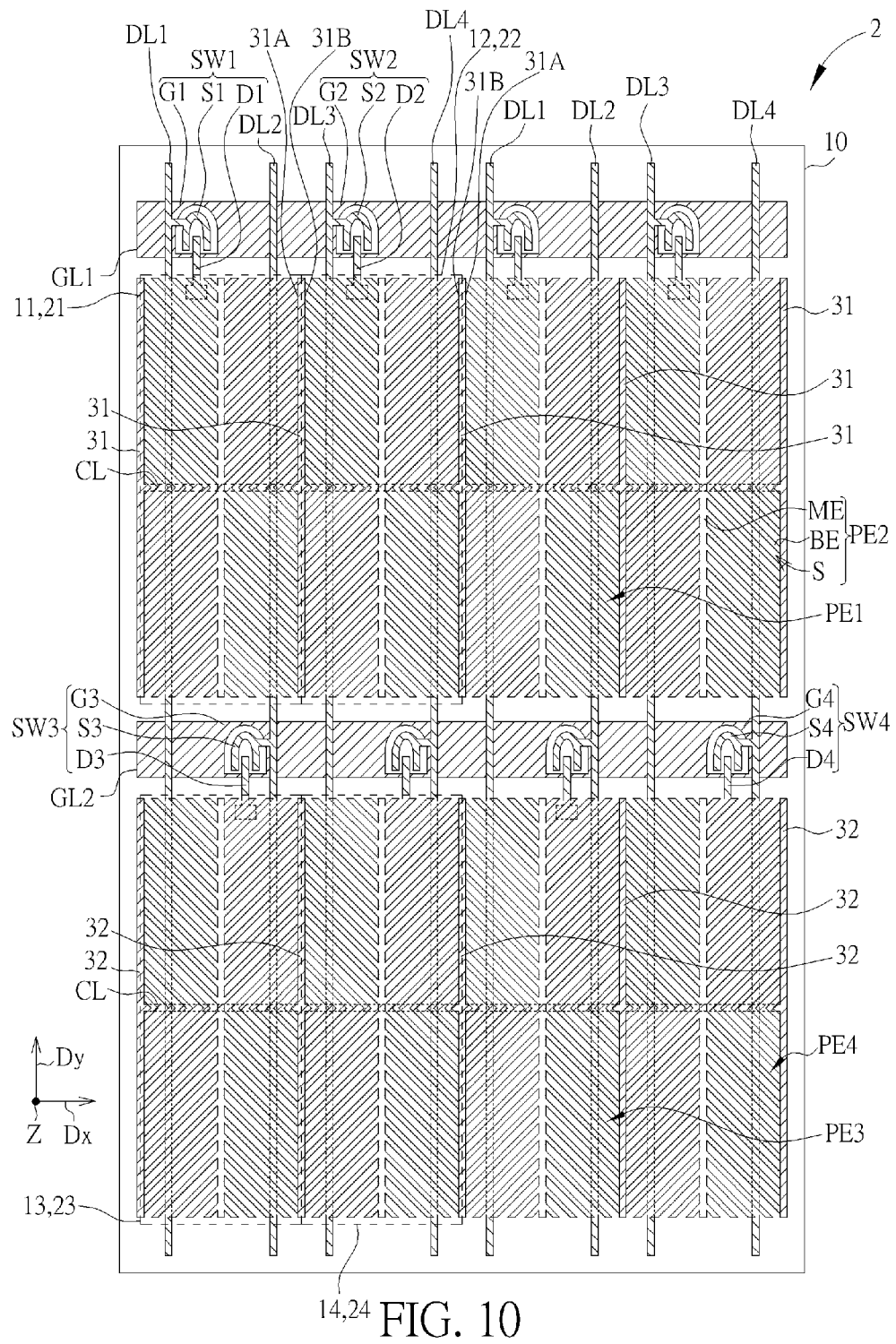
FIG. 10 is a schematic diagram illustrating a display panel according to a second embodiment of the present invention.

Please refer to FIG. 10. FIG. 10 is a schematic diagram illustrating a display panel according to a second embodiment. As shown in FIG. 10, the connections between the switch element and the data line of each sub-pixel in a display panel 2 of the second embodiment are different from the embodiment mentioned above. Specifically, in the second embodiment, the first source electrode 51 of the first switch element SW1 is electrically connected with the first data line DL1, the second source electrode S2 of the second switch element SW2 is electrically connected with the third data line DL3, the third source electrode S3 of the third switch element SW3 is electrically connected with the second data line DL2, and the fourth source electrode S4 of the fourth switch element SW4 is electrically connected with the fourth data line DL4.

Figure 11:
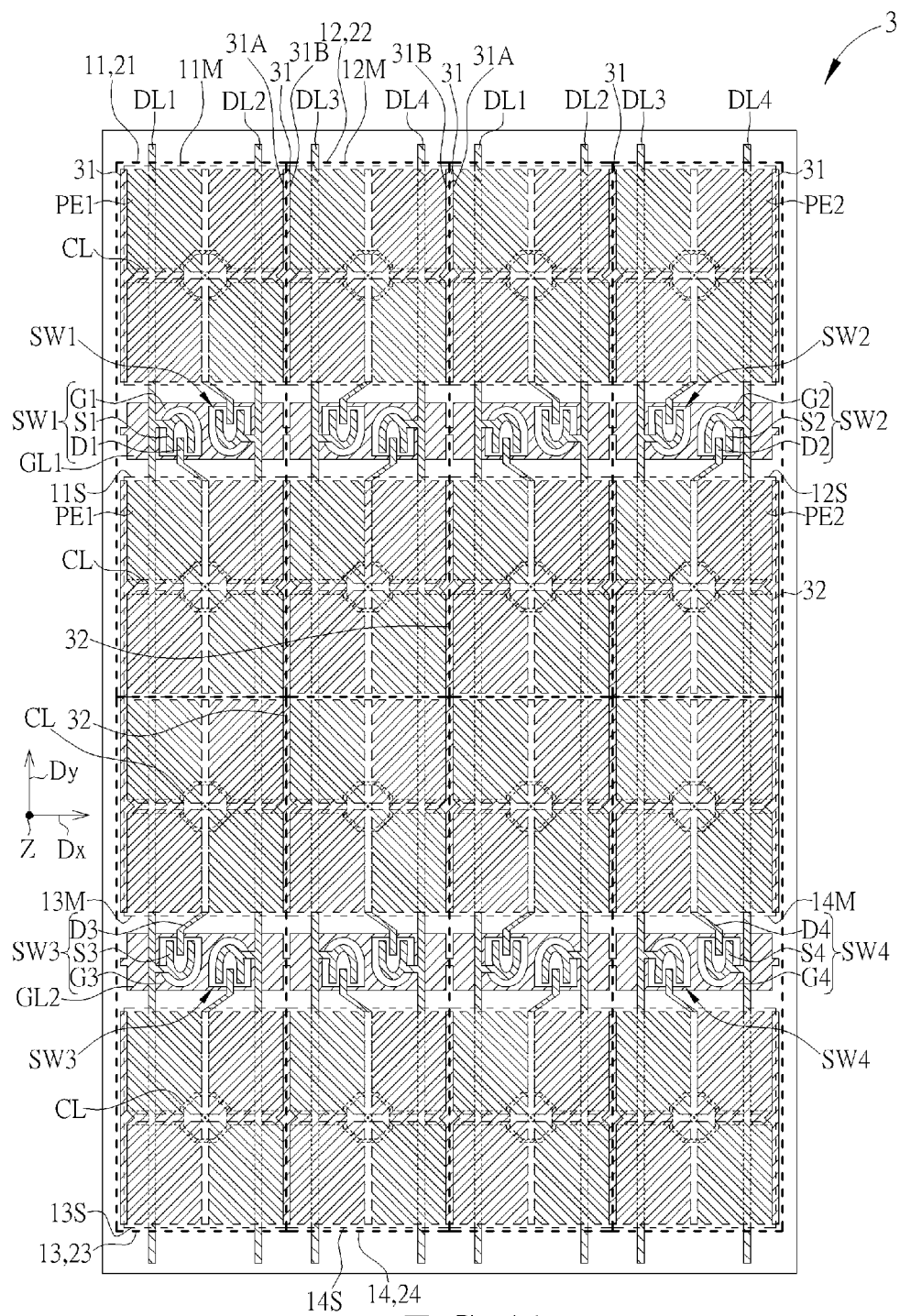
FIG. 11 is a schematic diagram illustrating a display panel according to a third embodiment of the present invention.
Figure 12:
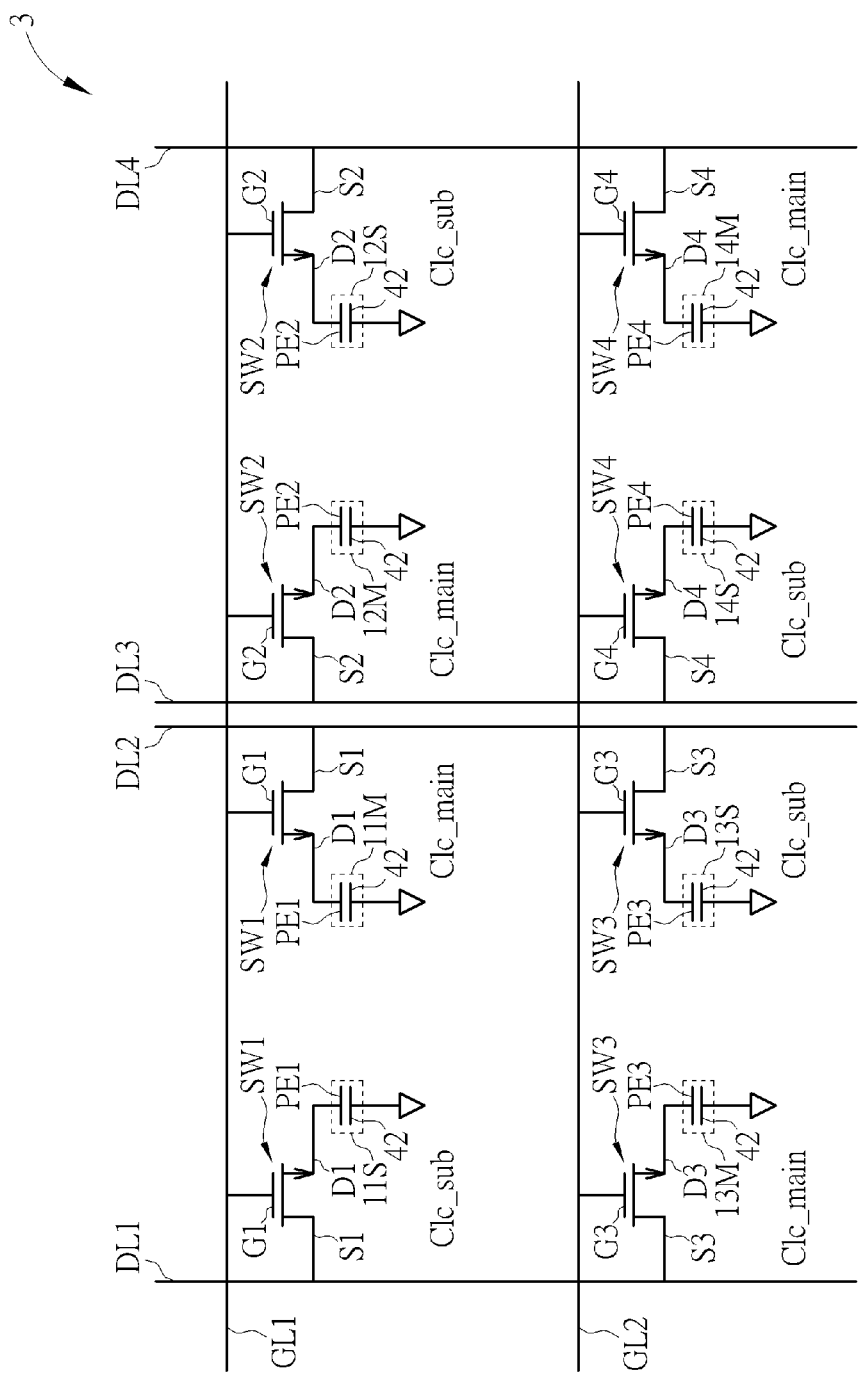
FIG. 12 is a schematic diagram illustrating an equivalent circuit of the display panel according to the third embodiment of the present invention.

Please refer to FIG. 11 and FIG. 12. FIG. 11 is a schematic diagram illustrating a display panel according to a third embodiment. FIG. 12 is a schematic diagram illustrating an equivalent circuit of the display panel according to the third embodiment. In a display panel 3 of this embodiment shown in FIG. 11 and FIG. 12, each sub-pixel region includes a main region and a sub-region. Specifically, the first sub-pixel region 11 includes a first main region 11M and a first sub-region 11S; a second sub-pixel region 12 includes a second main region 12M and a second sub-region 12S; the third sub-pixel region 13 includes a third main region 13M and a third sub-region 13S, and the fourth sub-pixel region 14 includes a fourth main region 14M and a fourth sub-region 14S. In this embodiment, the first gate line GL1 extends along the first direction Dx and is disposed between the first main region 11M and the first sub-region 11S and disposed between the second main region 12M and the second sub-region 12S; and the second gate line GL2 extends along the first direction Dx and is disposed between a third main region 13M and a third sub-region 13S and disposed between a fourth main region 14M and a fourth sub-region 14S. In addition, the first sub-pixel 21 includes two first switch elements SW1 and two first pixel electrodes PE1. Two first gate electrodes G1 are both electrically connected with the first gate line GL1, two first source electrodes S1 are electrically connected with the first data line DL1 and the second data line DL2 respectively, and two first drain electrodes D1 are electrically connected with the two first pixel electrodes PE1 respectively. The two first pixel electrodes PE1 are disposed within the first main region 11M and the first sub-region 11S respectively. The second sub-pixel 22 includes two second switch elements SW2 and two second pixel electrodes PE2. Two second gate electrodes G2 are both electrically connected with the first gate line GL1, two second source electrodes S2 are electrically connected with a third data line DL3 and a fourth data line DL4 respectively, and two second drain electrodes D2 are electrically connected with the two second pixel electrodes PE2 respectively. The two second pixel electrodes PE2 are disposed within the second main region 12M and the second sub-region 12S respectively. The third sub-pixel 23 includes two third switch elements SW3 and two third pixel electrodes PE3. Two third gate electrodes G3 are both electrically connected with the second gate line GL2, two third source electrodes S3 are electrically connected with the first data line DL1 and the second data line DL2 respectively, and two third drain electrodes D3 are electrically connected with the two third pixel electrodes PE3 respectively. The two third pixel electrodes PE3 are disposed within the third main region 13M and the third sub-region 13S respectively. The fourth sub-pixel 24 includes two fourth switch elements SW4 and two fourth pixel electrodes PE4. Two fourth gate electrodes G4 are both electrically connected with the second gate line GL2, two fourth source electrodes S4 are electrically connected with the third data line DL3 and the fourth data line DL4 respectively, and two fourth drain electrodes D4 are electrically connected with the two fourth pixel electrodes PE4 respectively. The two fourth pixel electrodes PE4 are disposed within the fourth main region 14M and the fourth sub-region 14S respectively.

In this embodiment, the first switch element SW1 in the first main region 11M is electrically connected with the second data line DL2, and the first switch element SW1 in the first sub-region 11S is electrically connected with the first data line DL1; the second switch element SW2 in the second main region 12M is electrically connected with the third data line DL3, and the second switch element SW2 in the second sub-region 12S is electrically connected with the fourth data line DL4; the third switch element SW3 in the third main region 13M is electrically connected with the first data line DL1, and the third switch element SW3 in the third sub-region 13S is electrically connected with the second data line DL2; the fourth switch element SW4 of the fourth main region 14M is electrically connected with the fourth data line DL4, and the fourth switch element SW4 of the fourth sub-region 14S is electrically connected with the third data line DL3, thereby, the display panel 2 of this embodiment may support the dot inversion driving method, so as to reduce the flicker issue.

A main liquid crystal capacitance Clc_main is generated between the pixel electrode and the common electrode 42 in each of the main regions, and a sub-liquid crystal capacitance Clc_sub is generated between the pixel electrode and the common electrode 42 in each of the sub-regions, wherein the main liquid crystal capacitance Clc_main may not be the same as the sub-liquid crystal capacitance Clc_sub. For example, the main liquid crystal capacitance Clc_main is greater than the sub-liquid crystal capacitance Clc_sub. The main region and the sub-region in the same sub-pixel region are controlled by a same gate line but receive different signals from different data lines respectively. Accordingly, the main region and the sub-region in each of the sub-pixel regions may provide images in different brightness for solving the color washout problem effectively. For example, the brightness of the main region may be higher than the brightness of the sub-region, and the ratio of the area of the main region to the area of the sub-region may be modified according to the display performance. For instance, the area of the main region may be less than the area of the sub-region, but not limited thereto. The connections between the switch elements and the data lines of the display panel 3 in this embodiment are not limited to the above mentioned methods, and the method of the second embodiment shown in FIG. 10 or other alternative methods may be applied. The corresponding positions of the pixel electrodes and the shielding electrodes are not limited to the above mentioned methods, and the method of the alternative embodiment shown in FIG. 8 or other alternative methods may be applied. The data line is not limited to be formed by the single patterned conductive layer, and may be formed by double patterned conductive layers according to the alternative embodiment shown in FIG. 9.

Figure 13:
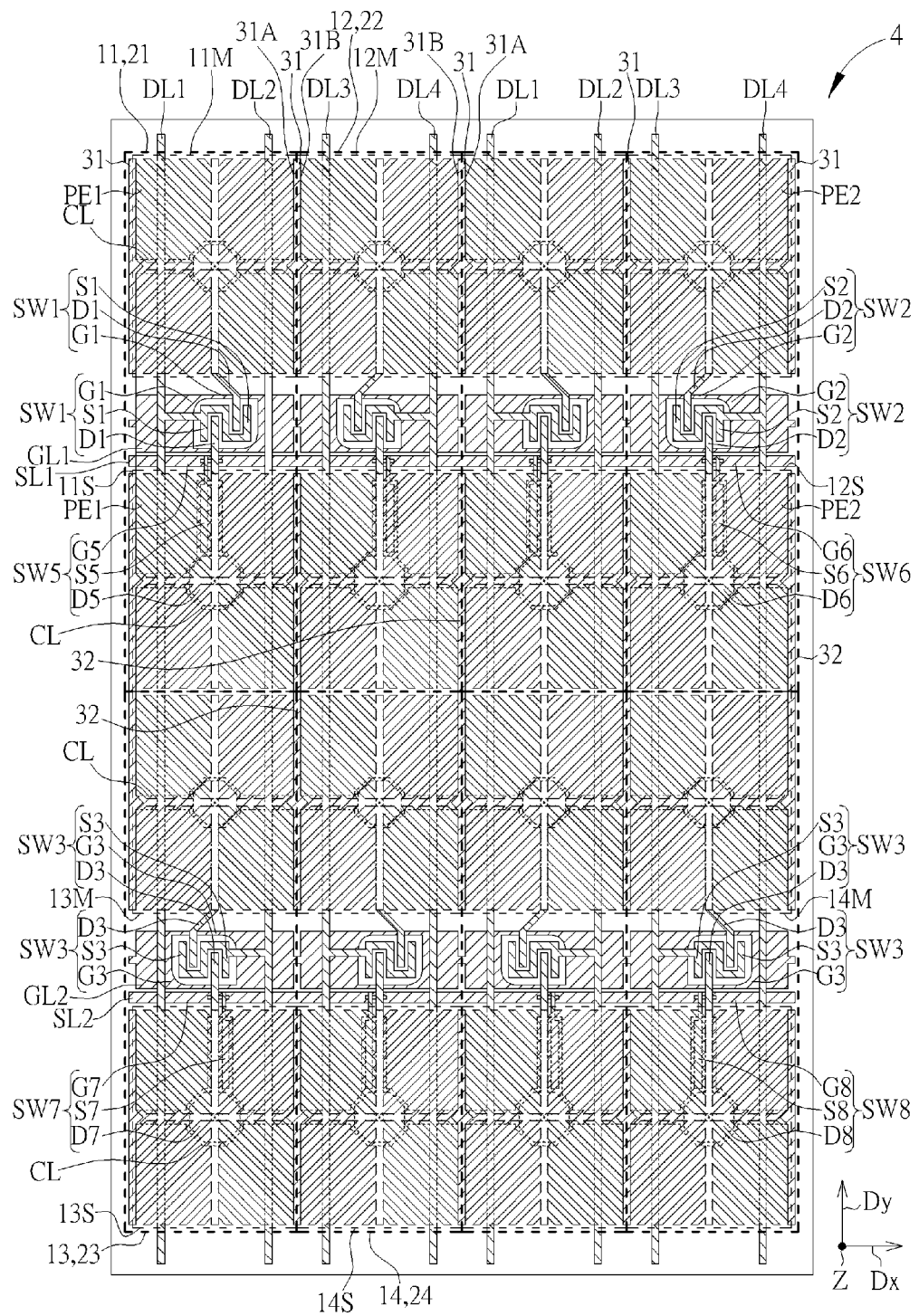
FIG. 13 is a schematic diagram illustrating a display panel according to a fourth embodiment of the present invention.
Figure 14:
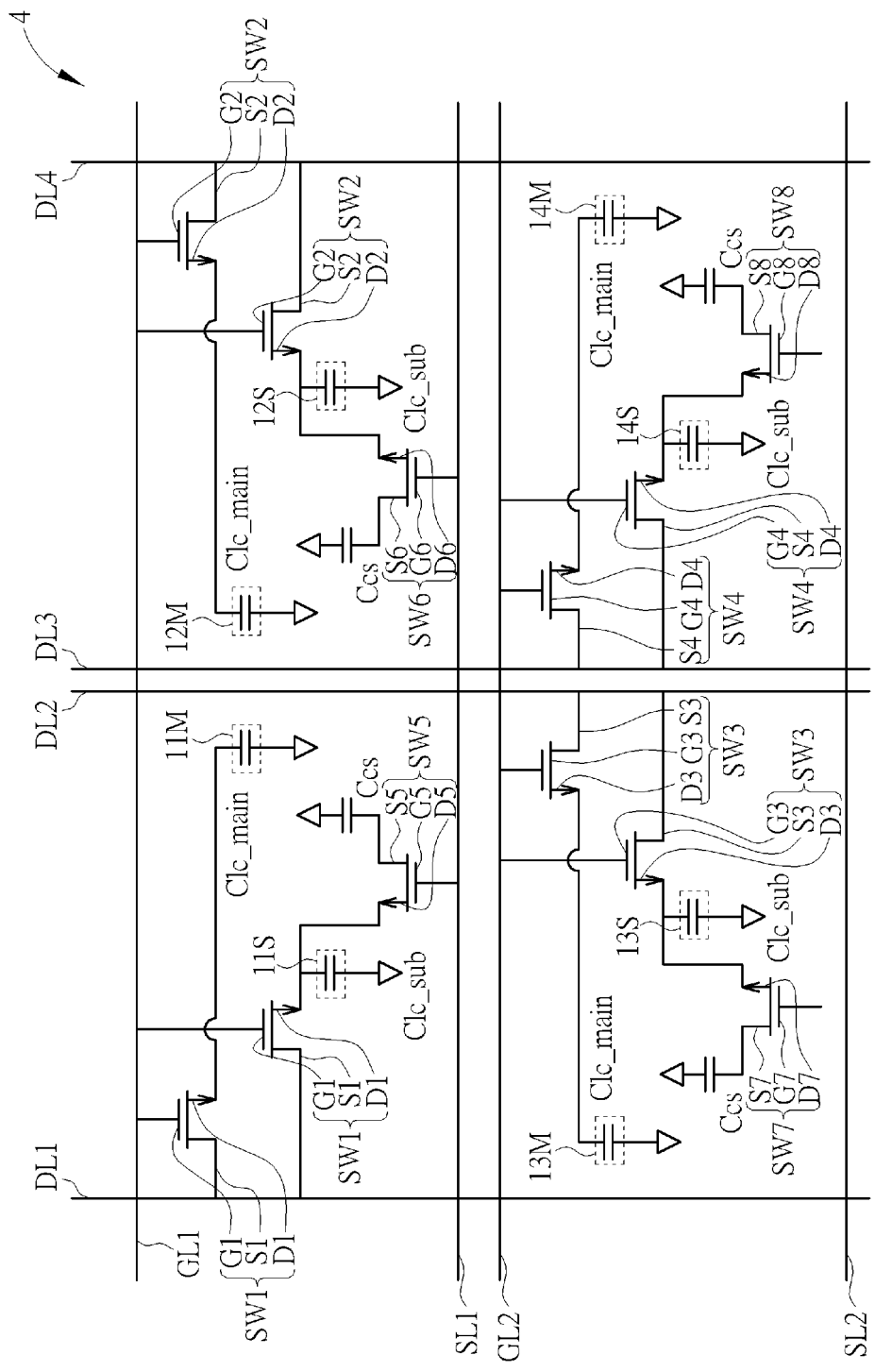
FIG. 14 is a schematic diagram illustrating an equivalent circuit of the display panel according to the fourth embodiment of the present invention.

Please refer to FIG. 13 and FIG. 14. FIG. 13 is a schematic diagram illustrating a display panel according to a fourth embodiment. FIG. 14 is a schematic diagram illustrating an equivalent circuit of the display panel according to the fourth embodiment. As shown in FIG. 13 and FIG. 14, a display panel 4 of this embodiment has a structure similar to the display panel 3 of the third embodiment, and the following description will detail the dissimilarities. In this embodiment, two source electrodes of two switch elements in each of the sub-pixel regions are electrically connected with a same data line. Specifically, two first source electrodes 51 of two first switch elements SW1 in the first sub-pixel 21 are connected with each other and both electrically connected with the same data line such as the first data line DL1; two second source electrodes S2 of two second switch elements SW2 in the second sub-pixel 22 are connected with each other and electrically connected with the same data line such as the fourth data line DL4; two third source electrodes S3 of two third switch elements SW3 in the third sub-pixel 23 are connected with each other and electrically connected with the same data line such as the second data line DL2; and two fourth source electrodes S4 of two fourth switch elements SW4 in the fourth sub-pixel 24 are connected with each other and electrically connected with the same data line such as the third data line DL3.

In addition, the display panel 4 of this embodiment further includes a plurality of first signal lines SL1 and a plurality of second signal lines SL2. Each of the first signal lines SL1 extends along the first direction Dx and is disposed between the first main region 11M and the first sub-region 11S and disposed between the second main region 12M and the second sub-region 12S, and each of the second signal lines SL2 extends along the first direction Dx and is disposed between the third main region 13M and the third sub-region 13S and disposed between the fourth main region 14M and the fourth sub-region 14S. Each of the first sub-pixels 21 further includes a fifth switch element SW5, each of the second sub-pixels 22 further includes a sixth switch element SW6, each of the third sub-pixels 23 further includes a seventh switch element SW7, and each of the fourth sub-pixels 24 further includes an eighth switch element SW8. The fifth switch element SW5 has a fifth gate electrode G5, a fifth source electrode S5 and a fifth drain electrode D5, wherein the fifth gate electrode G5 is electrically connected with the first signal line SL1, the fifth source electrode S5 is set to be floating, and the fifth drain electrode D5 is electrically connected with one of the first drain electrodes D1. The sixth switch element SW6 has a sixth gate electrode G6, a sixth source electrode S6 and a sixth drain electrode D6, wherein the sixth gate electrode G6 is electrically connected with the first signal line SL1, the sixth source electrode S6 is set to be floating, and the sixth drain electrode D6 is electrically connected with one of the second drain electrodes D2. The seventh switch element SW7 has a seventh gate electrode G7, a seventh source electrode S7 and a seventh drain electrode D7, wherein the seventh gate electrode G7 is electrically connected with the second signal line SL2, the seventh source electrode S7 is set to be floating, and the seventh drain electrode D7 is electrically connected with one of the third drain electrodes D3. The eighth switch element SW8 has an eighth gate electrode G8, an eighth source electrode S8 and an eighth drain electrode D8, wherein the eighth gate electrode G8 is electrically connected with the second signal line SL2, the eighth source electrode S8 is set to be floating, and the eighth drain electrode D8 is electrically connected with one of the fourth drain electrodes D4. In this embodiment, the first signal line SL1 may provide a gate electrode signal to trigger the fifth switch element SW5 and the sixth switch element SW6, and the time sequence of the gate electrode signal of the first signal line SL1 is later than the time sequence of the gate electrode signal of the first gate line GL1. The second signal line SL2 may provide another gate electrode signal to trigger the seventh switch element SW7 and the eighth switch element SW8, and the time sequence of the gate electrode signal of the second signal line SL2 is later than the time sequence of the gate electrode signal of the second gate line GL2. For example, the first signal line SL1 may be electrically connected with another first gate line GL1 (the first gate line GL1 used to drive the sub-pixels in the below two rows for example), and the second signal line SL2 may be electrically connected with another second gate line GL2 (the second gate line GL2 used to drive the sub-pixels in the below two rows for example). A storage capacitance Ccs may be formed between the fifth source electrode S5 of the fifth switch element SW5 and the common line CL; a storage capacitance Ccs may be formed between the sixth source electrode S6 of the sixth switch element SW6 and the common line CL; a storage capacitance Ccs may be formed between the seventh source electrode S7 of the seventh switch element SW7 and the common line CL; and a storage capacitance Ccs may be formed between the eighth source electrode S8 of the eighth switch element SW8 and the common line CL. According to the above mentioned arrangement, when the fifth switch element SW5, the sixth switch element SW6, the seventh switch element SW7 and the eighth switch element SW8 open, each of the storage capacitances Ccs will share electric charges with the sub-liquid crystal capacitances Clc_sub in the first sub-pixel 21, the second sub-pixel 22, the third sub-pixel 23 and the fourth sub-pixel 24 respectively, so that the main liquid crystal capacitance Clc_main will not be the same as the sub-liquid crystal capacitance Clc_sub in each of the sub-pixels. For example, the main liquid crystal capacitance Clc_main is greater than the sub-liquid crystal capacitance Clc_sub. Thereby, the main region and the sub-region of each of the sub-pixel regions may provide images in different brightness to solve the color washout problem. The connections between the switch elements and the data lines of the display panel 4 in this embodiment are not limited to the above mentioned methods, the method of the second embodiment shown in FIG. 10 or other alternative methods may be applied; the corresponding positions of the pixel electrodes and the shielding electrodes are not limited to the above mentioned methods, and the method of the alternative embodiment shown in FIG. 8 or other alternative methods may be applied; the data line is not limited to be formed by the single patterned conductive layer, and may be formed by double patterned conductive layers according to the alternative embodiment shown in FIG. 9.

Figure 15:
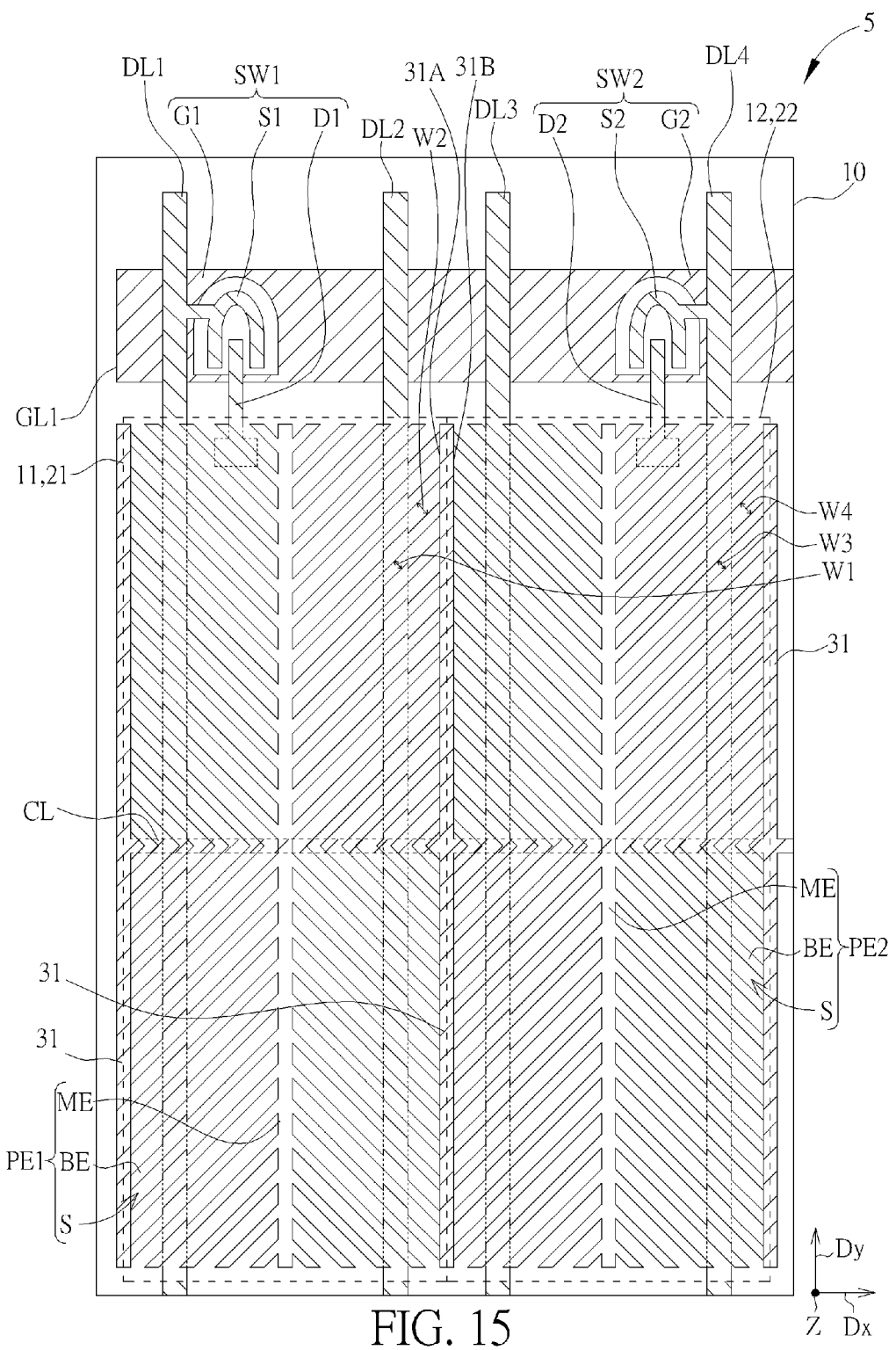
FIG. 15 is a schematic diagram illustrating a display panel according to a fifth embodiment of the present invention.

Please refer to FIG. 15. FIG. 15 is a schematic diagram illustrating a display panel according to a fifth embodiment. As shown in FIG. 15, the display panel 5 of the fifth embodiment and the display panel 1 of the first embodiment have different pattern designs of pixel electrode. Specifically, the slits of the pixel electrode of the display panel 5 have unequal width design. For example, the slits of the pixel electrode of this embodiment have discrete unequal width design. That is, the width (first width W1) of the slit S of the first pixel electrode PE1 overlapping the first data line DL1 and the second data line DL2 in the vertical projection direction Z is less than the width (second width W2) of the slit S of the first pixel electrode PE1 not overlapping the first data line DL1 and the second data line DL2 in the vertical projection direction Z; and the width (third width W3) of the slit S of the second pixel electrode PE2 overlapping the third data line DL3 and the fourth data line DL4 in the vertical projection direction Z is less than the width (fourth width W4) of the slit S of the second pixel electrode PE2 not overlapping the third data line DL3 and the fourth data line DL4 in the vertical projection direction Z. In other words, the first width W1 is less than the second width W2, and the third width W3 is less than the fourth width W4. In addition, the first width W1 may be equal to the third width W3, and the second width W2 may be equal to the fourth width W4, but not limited thereto. For example, the ratio of the first width W1 to the second width W2 may gradually decrease to 0.8, and the ratio of the third width W3 to the fourth width W4 may gradually decrease to 0.8, but not limited thereto. Furthermore, the width of the slit S outside the data line may be equal or unequal to the width of the slit S inside the data line, i.e. the variation of the width of the slit S may be three or more steps. Since a portion of the pixel electrode protrudes out from the data line, there may be some pattern transferring error in the photolithography process. For example, the actual ratio of the first width W1 to the second width W2 and the actual ratio of the third width W3 to the fourth width W4 may be greater than that of the pattern of the photomask. Therefore, the pattern transferring error should be considered. In this embodiment, the width of the slit S of the first pixel electrode PE1 overlapping the first data line DL1 and the second data line DL2 and the width of the slit S of the second pixel electrode PE2 overlapping the third data line DL3 and the fourth data line DL4 in the vertical projection direction Z is less, and thus the width (area) of the branch electrodes BE of the first pixel electrode PE1 overlapping the first data line DL1 and the second data line DL2 and the width (area) of the branch electrodes BE of the second pixel electrode PE2 overlapping the third data line DL3 and the fourth data line DL4 in the vertical projection direction Z are increased, which improve the electric field shielding effect between the first data line DL1/the second data line DL2 and the common electrode 42 as well as the electric field shielding effect between the third data line DL3/the fourth data line DL4 and the common electrode 42. In this embodiment, the width of the slit S is reduced by forming a bulge (protrusion part) in one side of the branch electrode BE corresponding to the data line, but not limited thereto. For example, the bulge may be formed in both sides of the branch electrode BE. In an alternative embodiment, the unequal width slit design of the pixel electrode may be continuous, i.e. the width of the slit continuously decreases toward the data line, or the variation of the width of the slit may be both continuous and discrete.

In this embodiment, the branch electrode BE may be aligned with the edge of the first shielding electrode 31, or the branch electrode BE may at least partially overlap or not overlap the first shielding electrode 31 in the vertical projection direction Z. It is appreciated that FIG. 13 and FIG. 14 only depict the first pixel electrode PE1 and the second pixel electrode PE2, and the third pixel electrode PE3 and the fourth pixel electrode PE4 may have similar design, which is not redundantly described. In addition, the connections between the switch elements and the data lines of the display panel 5 in this embodiment are not limited to the above mentioned methods, and the method of the second embodiment shown in FIG. 10, the third embodiment shown in FIG. 11, the fourth embodiment shown in FIG. 13, or other alternative methods may be applied. The corresponding positions of the pixel electrodes and the shielding electrodes are not limited to the above mentioned methods, and the method of the alternative embodiment shown in FIG. 8 or other alternative methods may be applied. The data line is not limited to be formed by the single patterned conductive layer, and may be formed by double patterned conductive layers according to the alternative embodiment shown in FIG. 9.

Please refer to Table 1. Table 1 lists a simulation result of vertical crosstalk of the display panel according to fifth embodiment of the present invention.

TABLE 1

| Gray scale | | Comparative embodiment | Present embodiment |
|---|---|---|---|
| L15 | reference image brightness(nit) | 1.76 | 2.34 |
| | test image brightness(nit) | 1.91 | 2.38 |
| | vertical crosstalk | 8.52% | 1.71% |
| L25 | reference image brightness(nit) | 3.15 | 4.12 |
| | test image brightness(nit) | 3.30 | 4.14 |
| | vertical crosstalk | 4.76% | 0.49% |
| L32 | reference image brightness(nit) | 4.25 | 5.44 |
| | test image brightness(nit) | 4.42 | 5.52 |
| | vertical crosstalk | 4.00% | 1.47% |

In the aforementioned simulation, the reference image brightness is the actual brightness of the entire screen when the entire screen displays a predetermined gray scale (e.g. L15, L25 and L32), the test image brightness is the actual brightness of an adjacent region adjacent to a central region of the screen in a vertical direction when the adjacent region displays a predetermined gray scale (e.g. L15, L25 and L32) and when the central region displays the maximum gray scale (e.g. L255). As shown in Table 1, compared with the comparative embodiment, the display panel of the present embodiment in which the pixel electrode has unequal width slit design is able to reduce vertical crosstalk and improve display quality.

Figure 16:
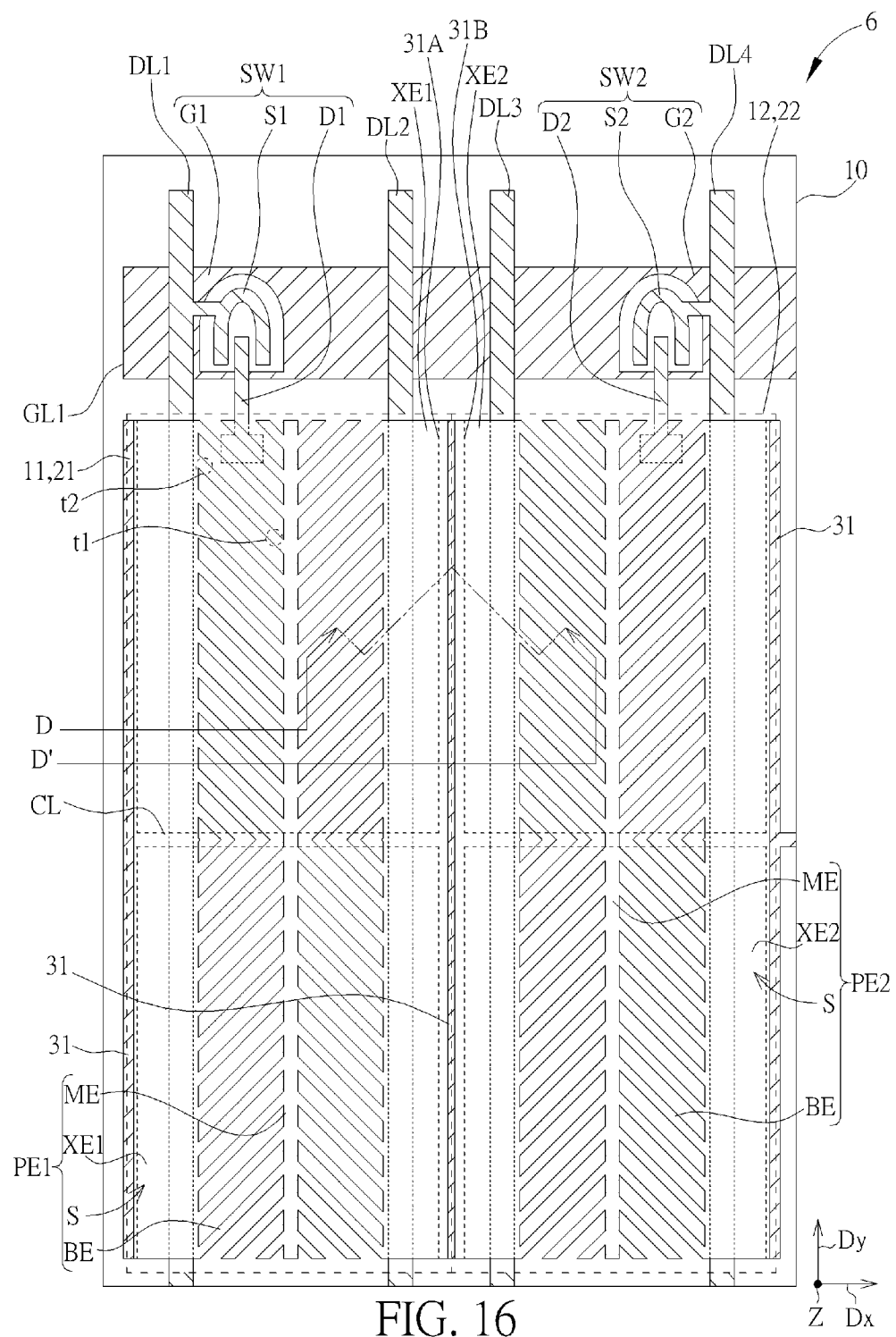
FIG. 16 is a schematic diagram illustrating a display panel according to a sixth embodiment of the present invention.
Figure 17:
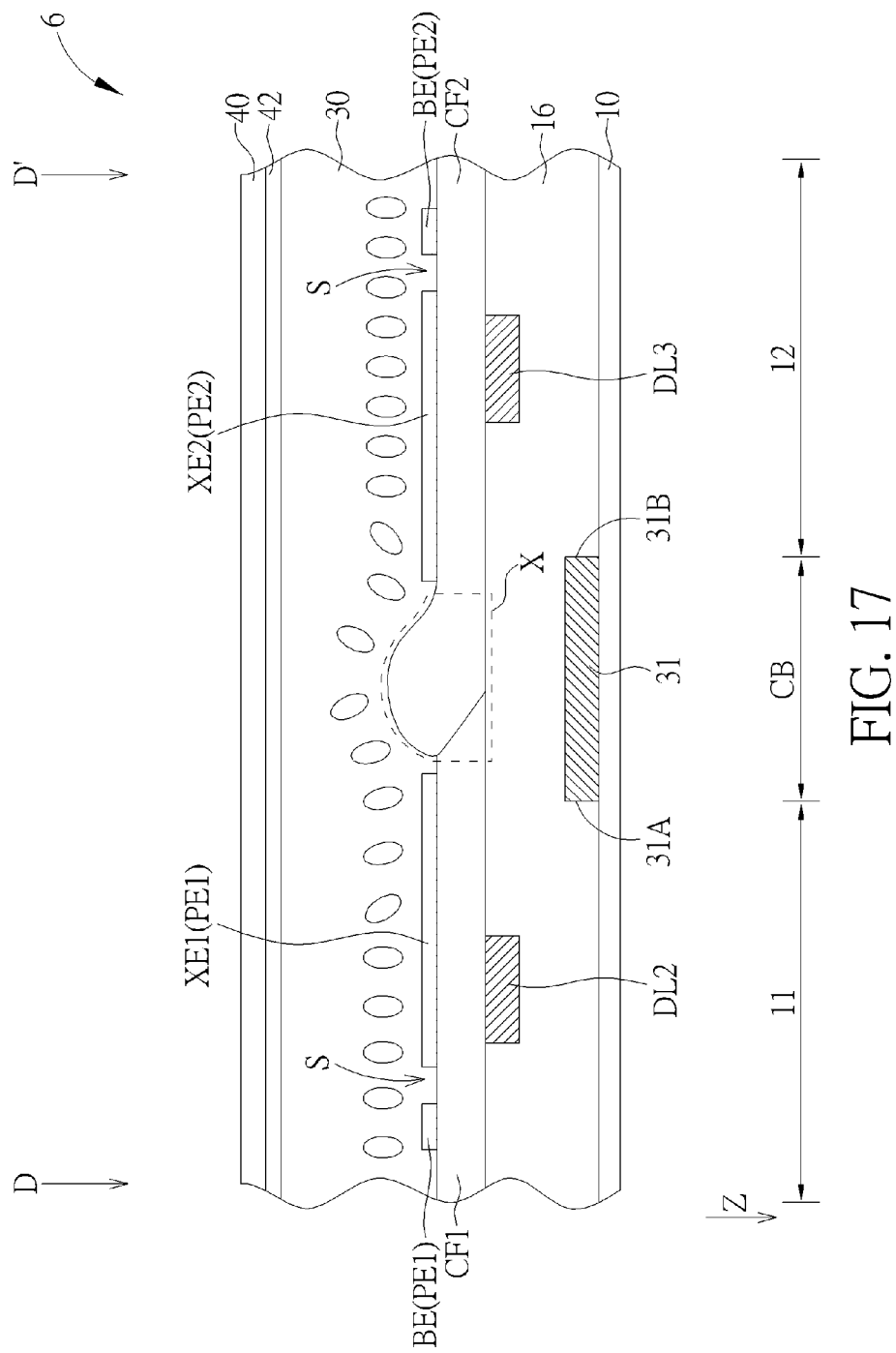
FIG. 17 is a schematic diagram illustrating a cross-sectional view of the display panel taken along a line D-D' in FIG. 16.

Please refer to FIG. 16 and FIG. 17. FIG. 16 is a schematic diagram illustrating a display panel according to a sixth embodiment, and FIG. 17 is a schematic diagram illustrating a cross-sectional view of the display panel taken along a line D-D' in FIG. 16. As shown in FIG. 16 and FIG. 17, in the display panel 6 of the sixth embodiment, each pixel electrode (including the first pixel electrode PE1 and the second pixel electrode PE2) comprises a main electrode ME, and a plurality of branch electrodes BE, wherein a first end t1 of each of the branch electrodes BE is connected to the main electrode ME, and the branch electrodes BE extend along different directions to form a plurality of alignment regions. Different from the display panel 1 of the first embodiment, the display panel 6 of the sixth embodiment further includes a plurality of stripe electrodes. For example, each first pixel electrode PE1 further includes two first stripe electrodes XE1 disposed adjacent to the first shielding electrodes 31 and connected to a portion of the second ends t2 of the branch electrodes BE respectively; each second pixel electrode PE2 further includes two second stripe electrodes XE2 disposed adjacent to the first shielding electrodes 31 and connected to a portion of the second ends t2 of the branch electrodes BE respectively. One of the first stripe electrodes XE1 at least partially overlaps the first data line DL1 in the vertical projection direction Z, and the other one of the first stripe electrodes XE1 at least partially overlaps the second data line DL2 in the vertical projection direction Z. One of the second stripe electrodes XE2 at least partially overlaps the third data line DL3 in the vertical projection direction Z, and the other one of the second stripe electrodes XE2 at least partially overlaps the fourth data line DL4 in the vertical projection direction Z. In this embodiment, the first stripe electrode XE1 at least entirely overlaps the first data line DL1 or the second data line DL2 in the vertical projection direction Z, and the second stripe electrode XE2 at least entirely overlaps the third data line DL3 or the fourth data line DL4 in the vertical projection direction Z. For example, the first stripe electrodes XE1 may further extend toward to the first shielding electrodes 31 and partially overlap the first shielding electrodes 31 respectively in the vertical projection direction Z, and the second stripe electrodes XE2 may further extend toward to the first shielding electrodes 31 and partially overlap the first shielding electrodes 31 respectively in the vertical projection direction Z. Also, there is a gap existing between the first stripe electrode XE1 and the second stripe electrode XE2 adjacent to each other, i.e. the first stripe electrode XE1 and the second stripe electrode XE2 adjacent to the first stripe electrode XE1 are not connected. In an alternative embodiment, the first stripe electrode XE1 does not partially overlap the first shielding electrode 31 in the vertical projection direction Z or is aligned with the edge of the first shielding electrode 31, and the second stripe electrode XE2 does not partially overlap the first shielding electrode 31 in the vertical projection direction Z or is aligned with the edge of the first shielding electrode 31.

The connections between the switch elements and the data lines of the display panel 6 in this embodiment are not limited to the above mentioned methods, and the method of the second embodiment shown in FIG. 10, the third embodiment shown in FIG. 11, the fourth embodiment shown in FIG. 13, or other alternative methods may be applied. The corresponding positions of the pixel electrodes and the shielding electrodes are not limited to the above mentioned methods, and the method of the alternative embodiment shown in FIG. 8 or other alternative methods may be applied. The data line is not limited to be formed by the single patterned conductive layer, and may be formed by double patterned conductive layers according to the alternative embodiment shown in FIG. 9.

Please refer to Table 2. Table 2 lists a simulation result of vertical crosstalk of the display panel according to sixth embodiment of the present invention.

TABLE 2

| Gray scale | | Comparative embodiment | Present embodiment |
|---|---|---|---|
| L15 | reference image brightness(nit) | 1.76 | 2.49 |
| | test image brightness(nit) | 1.91 | 2.50 |
| | vertical crosstalk | 8.52% | 0.40% |
| L25 | reference image brightness(nit) | 3.15 | 4.40 |
| | test image brightness(nit) | 3.30 | 4.38 |
| | vertical crosstalk | 4.76% | −0.45% |
| L32 | reference image brightness(nit) | 4.25 | 5.92 |
| | test image brightness(nit) | 4.42 | 5.87 |
| | vertical crosstalk | 4.00% | −0.84% |

As shown in Table 2, compared with the comparative embodiment, the display panel of the present embodiment in which the pixel electrode has stripe electrode design is able to reduce vertical crosstalk and improve display quality.

Figure 18:
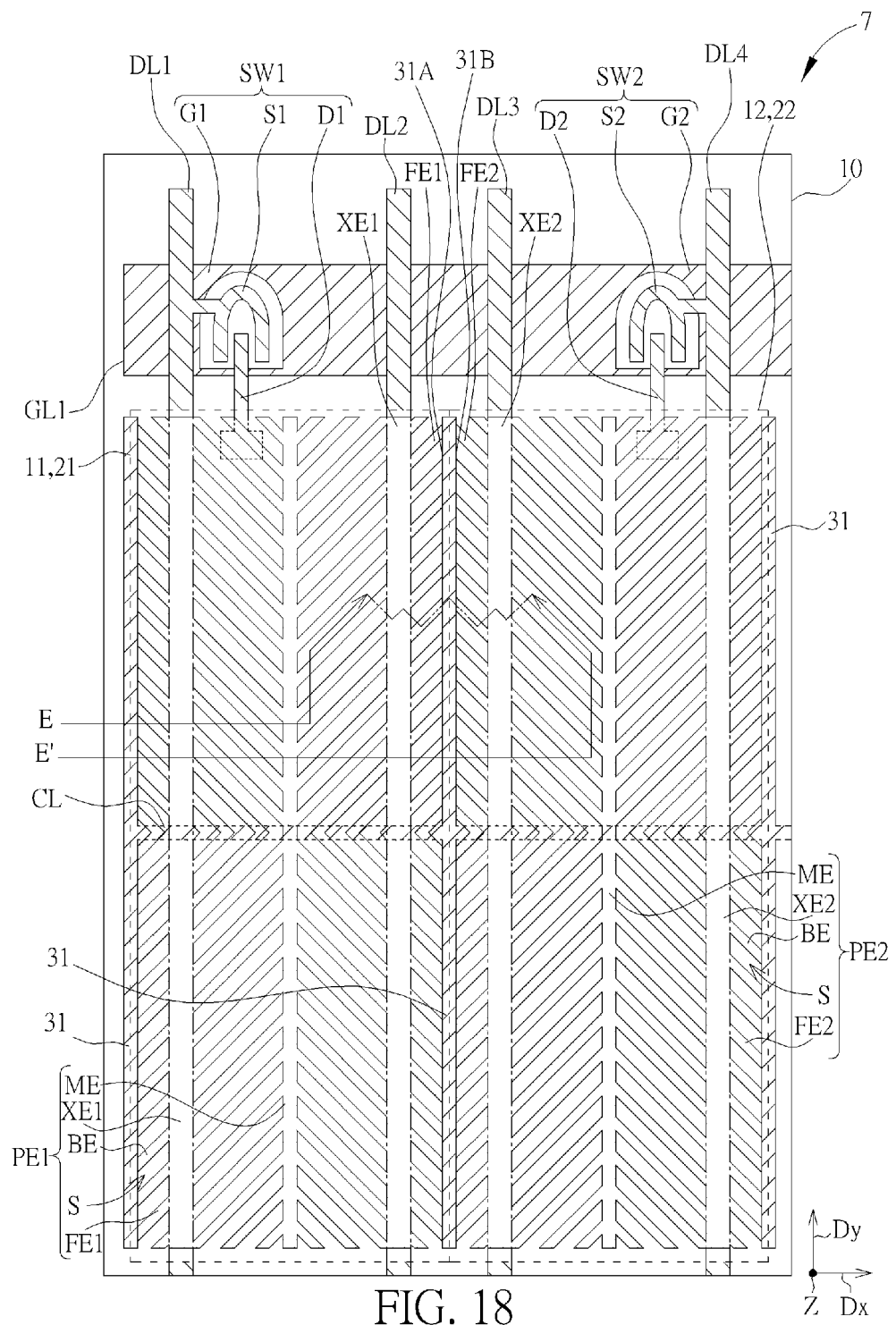
FIG. 18 is a schematic diagram illustrating a display panel according to a seventh embodiment of the present invention.
Figure 19:
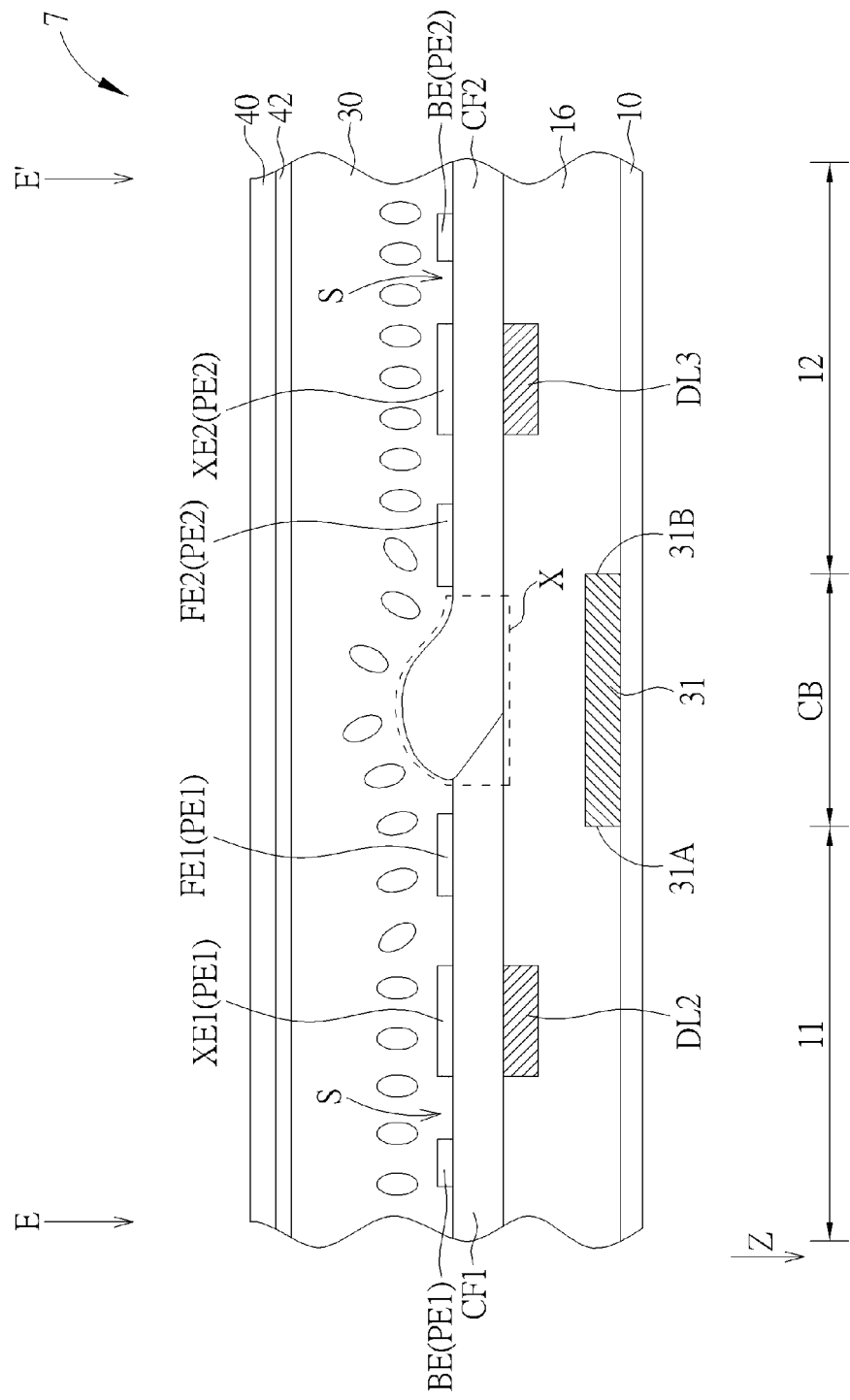
FIG. 19 is a schematic diagram illustrating a cross-sectional view of the display panel taken along a line E-E' in FIG. 18.

Please refer to FIG. 18 and FIG. 19. FIG. 18 is a schematic diagram illustrating a display panel according to a seventh embodiment, and FIG. 19 is a schematic diagram illustrating a cross-sectional view of the display panel taken along a line E-E' in FIG. 18. As shown in FIG. 18 and FIG. 19, different from the display panel 6 of the sixth embodiment, in the display panel 7 of the seventh embodiment, each pixel electrode further includes a plurality of fringe branch electrodes. For example, each of the first pixel electrode PE1 further includes a plurality of first fringe branch electrodes FE1, wherein one end of each of the first fringe branch electrodes FE1 is connected to one of the first stripe electrodes XE1, and the other end of at least a portion of the first fringe branch electrodes FE1 overlaps one of the first shielding electrodes 31. In other words, the first stripe electrode XE1 is connected between the first fringe branch electrodes FE1 and the branch electrodes BE, and the first fringe branch electrodes FE1 and the corresponding branch electrodes BE may extend along the same direction, but not limited thereto. Each of the second pixel electrode PE2 further includes a plurality of second fringe branch electrodes FE2, wherein one end of each of the second fringe branch electrodes FE2 is connected to one of the second stripe electrodes XE2, and the other end of at least a portion of the second fringe branch electrodes FE2 overlaps one of the first shielding electrodes 31. In other words, the second stripe electrode XE2 is connected between the second fringe branch electrodes FE2 and the branch electrodes BE, and the second fringe branch electrodes FE2 and the corresponding branch electrodes BE may extend along the same direction, but not limited thereto.

The connections between the switch elements and the data lines of the display panel 7 in this embodiment are not limited to the above mentioned methods, and the method of the second embodiment shown in FIG. 10, the third embodiment shown in FIG. 11, the fourth embodiment shown in FIG. 13, or other alternative methods may be applied. The corresponding positions of the pixel electrodes and the shielding electrodes are not limited to the above mentioned methods, and the method of the alternative embodiment shown in FIG. 8 or other alternative methods may be applied. The data line is not limited to be formed by the single patterned conductive layer, and may be formed by double patterned conductive layers according to the alternative embodiment shown in FIG. 9.

Please refer to Table 3. Table 3 lists a simulation result of vertical crosstalk of the display panel according to seventh embodiment of the present invention.

TABLE 3

| Gray scale | | Comparative embodiment | Present embodiment |
|---|---|---|---|
| L15 | reference image brightness(nit) | 1.19 | 2.05 |
| | test image brightness(nit) | 1.42 | 2.26 |
| | vertical crosstalk | 19.33% | 10.24% |
| L25 | reference image brightness(nit) | 2.41 | 3.69 |
| | test image brightness(nit) | 2.76 | 3.89 |
| | vertical crosstalk | 14.52% | 5.42% |
| L32 | reference image brightness(nit) | 3.51 | 4.97 |
| | test image brightness(nit) | 3.92 | 5.14 |
| | vertical crosstalk | 11.68% | 3.42% |

As shown in Table 3, compared with the comparative embodiment, the display panel of the present embodiment in which the pixel electrode has stripe electrode and fringe branch electrode design is able to reduce vertical crosstalk and improve display quality.

Figure 20:
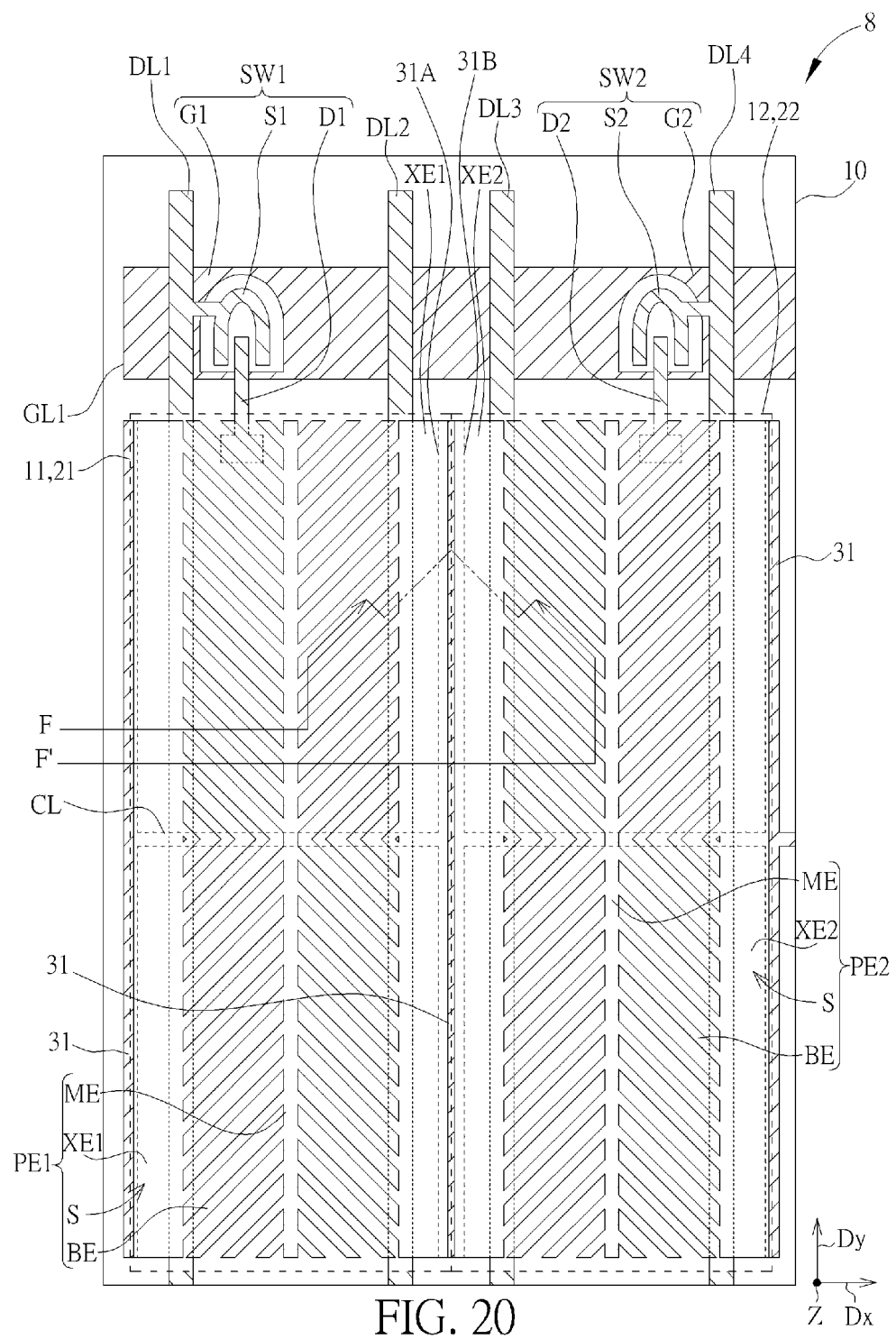
FIG. 20 is a schematic diagram illustrating a display panel according to an eighth embodiment of the present invention.
Figure 21:
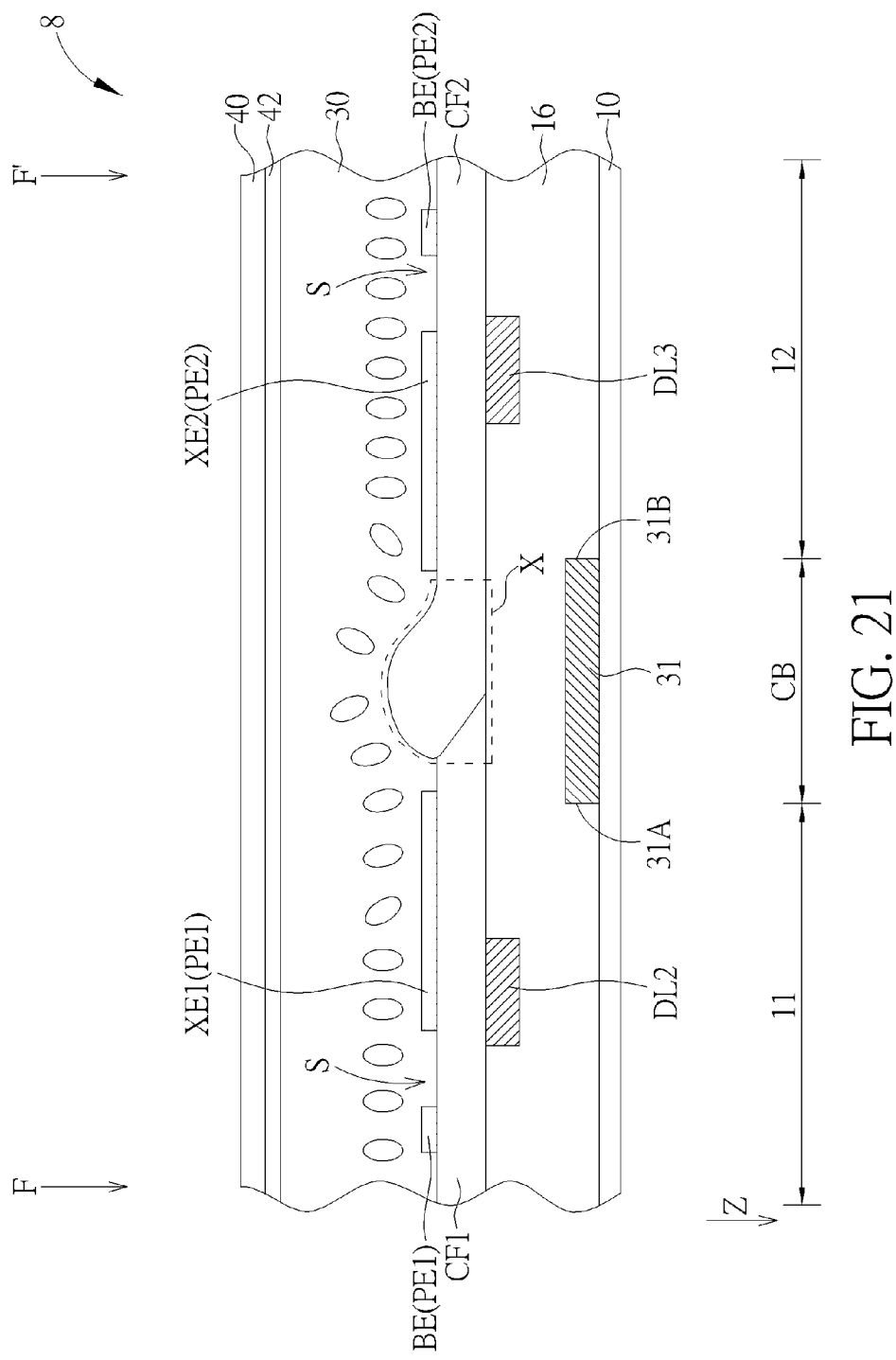
FIG. 21 is a schematic diagram illustrating a cross-sectional view of the display panel taken along a line F-F' in FIG. 20.

Please refer to FIG. 20 and FIG. 21. FIG. 20 is a schematic diagram illustrating a display panel according to an eighth embodiment, and FIG. 21 is a schematic diagram illustrating a cross-sectional view of the display panel taken along a line F-F' in FIG. 20. As shown in FIG. 20 and FIG. 21, different from the display panel 6 of the sixth embodiment, in the display panel 8 of the eighth embodiment, the first stripe electrode XE1 only overlaps the first data line DL1 or the second data line DL1 in the vertical projection direction Z, and the second stripe electrode XE2 only overlaps the third data line DL3 or the fourth data line DL4 in the vertical projection direction Z. In other words, one of the first stripe electrodes XE1, a portion of the branch electrodes BE and a portion of the slits S of the first pixel electrode PE1 partially overlap the first data line DL1 in the vertical projection direction Z, and the other one of the first stripe electrodes XE1, another portion of the branch electrodes BE and another portion of the slits S of the first pixel electrode PE1 partially overlap the second data line DL2 in the vertical projection direction Z; one of the second stripe electrodes XE2, a portion of the branch electrodes BE and a portion of the slits S of the second pixel electrode PE2 partially overlap the third data line DL3 in the vertical projection direction Z, and the other one of the second stripe electrodes XE2, another portion of the branch electrodes BE and another portion of the slits S of the second pixel electrode PE2 partially overlap the fourth data line DL4 in the vertical projection direction Z. In addition, the first stripe electrodes XE1 may further extend toward the first shielding electrodes 31 to partially overlap the first shielding electrodes 31 in the vertical direction Z respectively, and the second stripe electrodes XE2 may further extend toward the first shielding electrodes 31 to partially overlap the first shielding electrodes 31 in the vertical direction Z respectively.

The connections between the switch elements and the data lines of the display panel 8 in this embodiment are not limited to the above mentioned methods, and the method of the second embodiment shown in FIG. 10, the third embodiment shown in FIG. 11, the fourth embodiment shown in FIG. 13, or other alternative methods may be applied. The corresponding positions of the pixel electrodes and the shielding electrodes are not limited to the above mentioned methods, and the method of the alternative embodiment shown in FIG. 8 or other alternative methods may be applied. The data line is not limited to be formed by the single patterned conductive layer, and may be formed by double patterned conductive layers according to the alternative embodiment shown in FIG. 9.

Please refer to Table 4. Table 4 lists a simulation result of vertical crosstalk of the display panel according to eighth embodiment of the present invention.

TABLE 4

| Gray scale | | Comparative embodiment | Present embodiment |
|---|---|---|---|
| L15 | reference image brightness(nit) | 1.76 | 1.48 |
| | test image brightness(nit) | 1.91 | 1.54 |
| | vertical crosstalk | 8.52% | 4.05% |
| L25 | reference image brightness(nit) | 3.15 | 2.54 |
| | test image brightness(nit) | 3.30 | 2.58 |
| | vertical crosstalk | 4.76% | 1.57% |
| L32 | reference image brightness(nit) | 4.25 | 3.43 |
| | test image brightness(nit) | 4.42 | 3.45 |
| | vertical crosstalk | 4.00% | 0.58% |

As shown in Table 4, compared with the comparative embodiment, the display panel of the present embodiment in which the pixel electrode has stripe electrode design is able to reduce vertical crosstalk and improve display quality.

Figure 22:
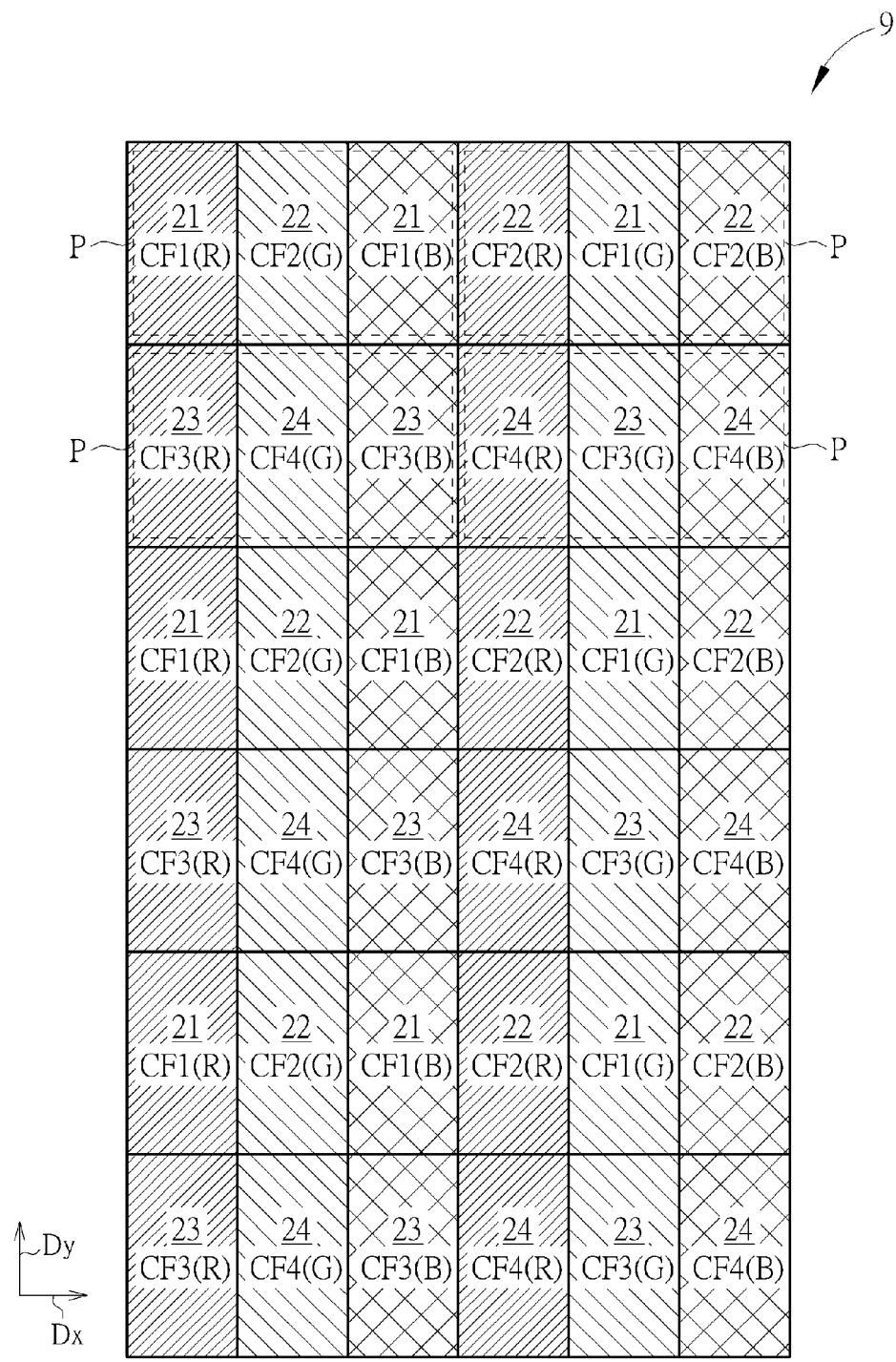
FIG. 22 is a schematic diagram illustrating an arrangement of color filter patterns according to an embodiment of the present invention.

Please refer to FIG. 22. FIG. 22 is a schematic diagram illustrating an arrangement of color filter patterns of an embodiment. In the display panel of the present invention, the arrangement of sub-pixels and the arrangement of the colors of the color filter patterns are not limited to the same rule. In a display panel 9 of this embodiment shown in FIG. 22, the first sub-pixel 21, the second sub-pixel 22, the third sub-pixel 23 and the fourth sub-pixel 24 may be arranged according to the above mentioned embodiments. For example, the first sub-pixels 21 and the second sub-pixels 22 are arranged alternately and repeatedly in the odd-numbered rows; the third sub-pixels 23 and the fourth sub-pixels 24 are arranged alternately and repeatedly in even-numbered rows, the first sub-pixels 21 and the third sub-pixels 23 are arranged alternately and repeatedly in the odd-numbered columns; and the second sub-pixels 22 and the fourth sub-pixels 24 are arranged alternately and repeatedly in even-numbered columns. Furthermore, the color filter patterns may be arranged in such as the stripe configuration. For example, the color filter patterns of all the sub-pixels in the $3n-2^{th}$ columns (whether the first color filter pattern CF1 of the first sub-pixel 21 or the third color filter pattern CF3 of the third sub-pixel 23) are the same color such as red R; the color filter patterns of all the sub-pixels in the $3n-1^{th}$ columns (the second color filter pattern CF2 of the second sub-pixel 22 and the fourth color filter pattern CF4 of the fourth sub-pixel 24) are the same color such as green G; and the color filter patterns of all the sub-pixels in the $3n^{th}$ columns (whether the first color filter pattern CF1 of the first sub-pixel 21 or the third color filter pattern CF3 of the third sub-pixel 23) are the same color such as blue B, wherein the n stands for a positive integer which is greater than or equal to 1. In addition, the adjoining three sub-pixels in the same row such as two first sub-pixels 21 and one second sub-pixel 22, two second sub-pixels 22 and one first sub-pixel 21, two third sub-pixels 23 and one fourth sub-pixel 24, or two fourth sub-pixels 14 and one third sub-pixel 13 may respectively construct a display pixel element P which can display images with full colors. In other alternative embodiments, the red R, green G and blue B may also be arranged in other arrangements such as a delta arrangement. What's more, the display pixel element P may be consisted of more colors such as red, green, blue and yellow, or red, green, blue and white.

Figure 23:
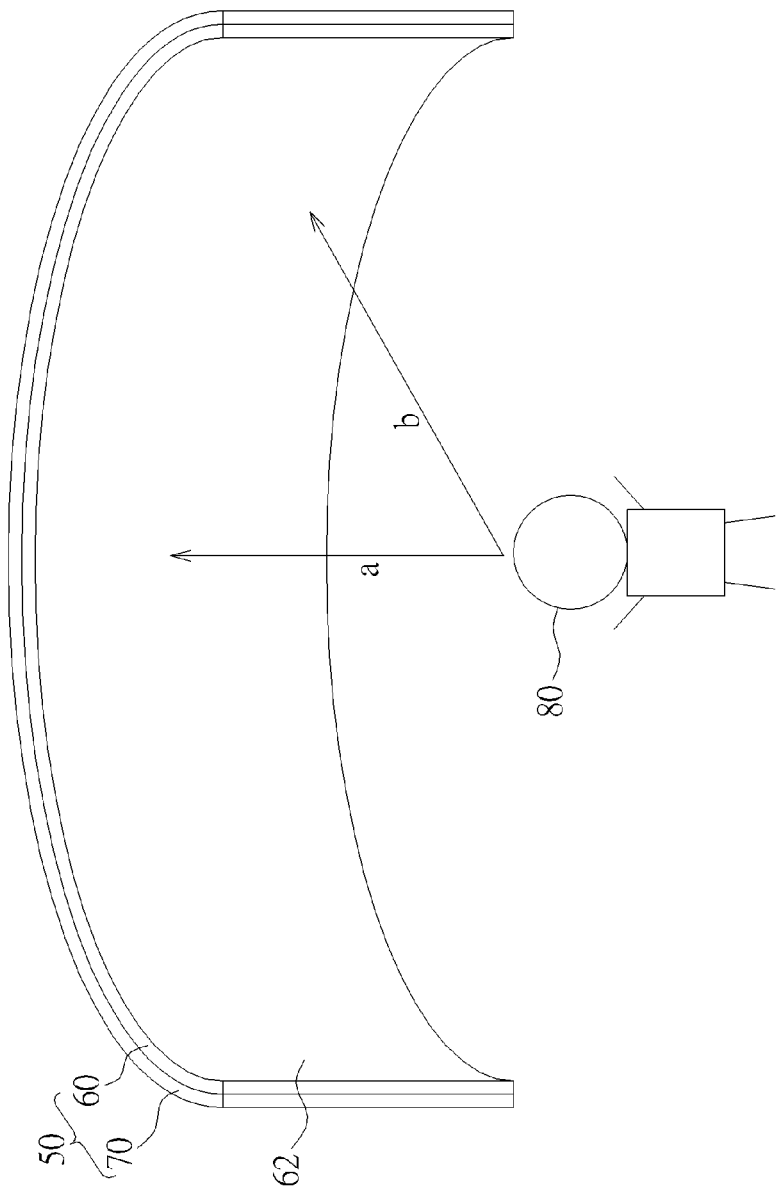
FIG. 23 is a schematic diagram illustrating a curved display according to an embodiment of the present invention.

Please refer to FIG. 23. FIG. 23 is a schematic diagram illustrating a curved display of an embodiment. As shown in FIG. 23, a curved display 50 of this embodiment includes a display panel 60 and a frame 70. The display panel 60 is combined with the frame 70, thereby, a curved display surface 62 having a curvature is formed in the display panel 60. In another aspect, a curved surface exists inside of the frame 70, and the display panel 60 is disposed inside the frame 70 and adhered to the curved surface of the frame 70, so as to form the display panel 60 with the curved display surface 62 having the curvature. The display panel 60 of this embodiment may be any display panel of the above mentioned embodiments, and the structures and features of the display panel are the same as the above mentioned contents and will not be describe redundantly here. As shown in FIG. 23, a distance a between eyes of the viewer 80 and the central region of the curved display 50 and a distance b between eyes of the viewer 80 and the peripheral region of the curved display 50 are substantially the same while the viewer 80 is watching the curved display 50 in a predetermined position. Accordingly, in the images displayed by the curved display 50, problems such as the brightness deviations and color deviations will not be an issue. In addition, the shielding electrodes which the design has mentioned above are disposed in the display panel 60, thereby, the light leakage issue may also be avoided.

To summarize the above descriptions, the shielding electrodes are disposed corresponding to the common boundaries of the adjoining two sub-pixel regions in the first direction on the first substrate of the display panel of the present invention. The leaked light may be effectively shielded without disposing light shielding patterns on the second substrate. In addition, the display panel of the present invention may be applied to the curved display, but not limited thereto. The display panel of the present invention may also be applied to the flat panel display or the flexible display.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A display panel, comprising:
a first substrate comprising a plurality of first sub-pixel regions and a plurality of second sub-pixel regions, wherein the first sub-pixel regions and the second sub-pixel regions are arranged alternately in a first direction in sequence;
a plurality of first gate lines disposed on the first substrate and extending along the first direction;
a plurality of first data lines, a plurality of second data lines, a plurality of third data lines and a plurality of fourth data lines sequentially disposed on the first substrate in sequence, the first data line, the second data line, the third data line and the fourth data line orderly along the first direction, and extending along a second direction, wherein each of the plurality of the first data lines and each of the plurality of the second data lines are disposed in each of the plurality of the first sub-pixel regions, each of the plurality of the third data lines and each of the plurality of the fourth data lines are disposed in each of the plurality of the second sub-pixel regions, and each of the plurality of the second data lines and each of the plurality of the third data lines are disposed between each of the plurality of the first data lines and each of the plurality of the fourth data lines;
a plurality of first color filter patterns disposed on the first substrate and in the first sub-pixel regions respectively;
a plurality of second color filter patterns disposed on the first substrate and in the second sub-pixel regions respectively;
a plurality of first sub-pixels disposed in the first sub-pixel regions respectively, wherein each of the plurality of the first sub-pixels is electrically connected with the first data line, the second data line or a combination thereof, and each of the plurality of the first sub-pixels comprises a first pixel electrode disposed on the first color filter pattern;
a plurality of second sub-pixels disposed in the second sub-pixel regions respectively, wherein each of the plurality of the second sub-pixels is electrically connected with the third data line, the fourth data line or a combination thereof, and each of the plurality of the second sub-pixels comprises a second pixel electrode disposed on the second color filter pattern; and
a plurality of first shielding electrodes disposed on the first substrate and extending along the second direction, wherein the first shielding electrodes are respectively disposed in a common boundary between the first sub-pixel region and the second sub-pixel region adjacent to each other, and each of the plurality of the first shielding electrodes has a fixed voltage;
a second substrate disposed opposite to the first substrate;
a common electrode disposed on the second substrate; and
a display medium layer disposed between the first substrate and the second substrate.

2. The display panel according to claim 1, wherein the first pixel electrode overlaps at least a portion of the first data line and at least a portion of the second data line in a vertical projection direction within the first sub-pixel region, and the second pixel electrode overlaps at least a portion of the third data lines and at least a portion of the fourth data lines in the vertical projection direction in the second sub-pixel region.

3. The display panel according to claim 2, wherein the first pixel electrode further extends toward two adjacent first shielding electrodes of the first shielding electrodes in the first direction and respectively protrudes from the first data line and the second data line, and the second pixel electrode further extends toward two adjacent first shielding electrodes of the first shielding electrodes in the first direction and respectively protrudes from the third data line and the fourth data line.

4. The display panel according to claim 3, wherein the first shielding electrode comprises a first edge adjoining to the first pixel electrode, a second edge adjoining to the second pixel electrode, the first pixel electrode is substantially aligned with the first edges of the two first shielding electrodes adjacent to the first pixel electrode in the first direction, and the second pixel electrode is substantially aligned with the second edges of the two first shielding electrodes adjacent to the second pixel electrode in the first direction.

5. The display panel according to claim 3, wherein the first pixel electrode overlaps a portion of the two first shielding electrodes adjacent to the first pixel electrode in the first direction in the vertical projection direction, and the second pixel electrode overlaps a portion of the two first shielding electrodes adjacent to the second pixel electrode in the first direction in the vertical projection direction.

6. The display panel according to claim 1, wherein each of the plurality of the first pixel electrodes and each of the plurality of the second pixel electrodes comprise:
   a main electrode;
   a plurality of branch electrodes, wherein a first end of each of the plurality of the branch electrodes is connected to the main electrode; and
   a plurality of slits disposed between any two adjacent branch electrodes of the plurality of the branch electrodes;
   wherein a portion of the branch electrodes and a portion of the slits of the first pixel electrode partially overlap the first data line in the vertical projection direction, another portion of the branch electrodes and another portion of the slits of the first pixel electrode overlap the second data line in the vertical projection direction, a portion of the branch electrodes and a portion of the slits of the second pixel electrode partially overlap the third data line in the vertical projection direction, and another portion of the branch electrodes and another portion of the slits of the second pixel electrode overlap the fourth data line in the vertical projection direction.

7. The display panel according to claim 6, wherein the portion of the branch electrodes and the portion of the slits of the first pixel electrode further extend toward the first shielding electrode to protrude from the first data line, the another portion of the branch electrodes and the another portion of the slits of the first pixel electrode further extend toward the first shielding electrode to protrude from the second data line, the portion of the branch electrodes and the portion of the slits of the second pixel electrode further extend toward the first shielding electrode to protrude from the third data line, and the another portion of the branch electrodes and the another portion of the slits of the second pixel electrode further extend toward the first shielding electrode to protrude from the fourth data line.

8. The display panel according to claim 7, wherein each of the plurality of the first shielding electrode comprises a first edge adjoining to the first pixel electrode, a second edge adjoining to the second pixel electrode, the portion and the another portion of the branch electrodes of the first pixel electrode are aligned with the first edges of the two first shielding electrodes adjacent to the first pixel electrode in the first direction, and the portion and the another portion of the branch electrodes of the second pixel electrode are aligned with the second edges of the two first shielding electrodes adjacent to the second pixel electrode in the first direction.

9. The display panel according to claim 7, wherein the portion and the another portion of the branch electrodes and the portion and the another portion of the slits of the first pixel electrode partially overlap the first shielding electrodes adjacent to the first pixel electrode in the first direction in the vertical projection direction, and the portion and the another portion of the branch electrodes and the portion and the another portion of the slits of the second pixel electrode partially overlap the first shielding electrodes adjacent to the second pixel electrode in the first direction in the vertical projection direction.

10. The display panel according to claim 7, wherein the slits of the first pixel electrode have an identical width, and the slits of the second pixel electrode have an identical width.

11. The display panel according to claim 7, wherein a width of the slit of the first pixel electrode overlapping the first data line and the second data line in the vertical projection direction is less than a width of the slit of the first pixel electrode not overlapping the first data line and the second data line in the vertical projection direction, and a width of the slit of the second pixel electrode overlapping the third data line and the fourth data line in the vertical projection direction is less than a width of the slit of the second pixel electrode not overlapping the third data line and the fourth data line in the vertical projection direction.

12. The display panel according to claim 2, wherein
   each of the plurality of the first pixel electrodes comprises:
      a main electrode;
      a plurality of branch electrodes, wherein a first end of each of the plurality of the branch electrodes is connected to the main electrode;
      a plurality of slits disposed between any two adjacent branch electrodes of the plurality of the branch electrodes; and
      two first stripe electrodes disposed adjacent to the first shielding electrodes and connected to second ends of the branch electrodes respectively; and
   each of the plurality of the second pixel electrodes comprises:
      a main electrode;
      a plurality of branch electrodes, wherein a first end of each of the plurality of the branch electrodes is connected to the main electrode;
      a plurality of slits disposed between any two adjacent branch electrodes of the plurality of the branch electrodes; and
      two second stripe electrodes disposed adjacent to the first shielding electrodes and connected to second ends of the branch electrodes respectively;
   wherein one of the first stripe electrodes at least partially overlaps the first data line in the vertical projection direction, the other one of the first stripe electrodes at least partially overlaps the second data line in the vertical projection direction, one of the second stripe electrodes at least partially overlaps the third data line in the vertical projection direction, and the other one of the second stripe electrodes at least partially overlaps the fourth data line in the vertical projection direction.

13. The display panel according to claim 12, wherein a gap exists between the first stripe electrode and the second stripe electrode adjacent to each other.

14. The display panel according to claim 12, wherein the first stripe electrodes further extend toward the first shielding electrodes to partially overlap the first shielding electrodes in the vertical projection direction respectively, and the second stripe electrodes further extend toward the first shielding electrodes to partially overlap the first shielding electrodes in the vertical projection direction respectively.

15. The display panel according to claim 12, wherein
each of the plurality of the first pixel electrode further comprises a plurality of first fringe branch electrodes, wherein one end of each of the plurality of the first fringe branch electrodes is connected to one of the first stripe electrodes, and the other end of at least a portion of the first fringe branch electrodes partially overlaps one of the first shielding electrodes; and
each of the plurality of the second pixel electrode further comprises a plurality of second fringe branch electrodes, wherein one end of each of the plurality of the second fringe branch electrodes is connected to one of the second stripe electrodes, and the other end of at least a portion of the second fringe branch electrodes partially overlaps one of the first shielding electrodes.

16. The display panel according to claim 12, wherein one of the first stripe electrodes, a portion of the branch electrodes and a portion of the slits of the first pixel electrode partially overlap the first data line in the vertical projection direction, the other one of the first stripe electrodes, another portion of the branch electrodes and another portion of the slits of the first pixel electrode partially overlap the second data line in the vertical projection direction, one of the second stripe electrodes, a portion of the branch electrodes and a portion of the slits of the second pixel electrode partially overlap the third data line in the vertical projection direction, and the other one of the second stripe electrodes, another portion of the branch electrodes and another portion of the slits of the second pixel electrode partially overlap the fourth data line in the vertical projection direction.

17. The display panel according to claim 16, wherein the first stripe electrodes of the first pixel electrodes further extend toward two adjacent first shielding electrodes of the first shielding electrodes in the first direction to partially overlap the first shielding electrodes in the vertical projection direction, and the second stripe electrodes of the second pixel electrodes further extend toward two adjacent first shielding electrodes of the first shielding electrodes in the first direction to partially overlap the first shielding electrodes in the vertical projection direction.

18. The display panel according to claim 1, further comprising a plurality of light shielding patterns disposed on the second substrate, wherein the light shielding patterns overlap the first gate lines in a vertical projection direction respectively.

19. The display panel according to claim 1, wherein
each of the plurality of the first sub-pixels comprises a first switch element, the first switch element comprises a first gate electrode, a first source electrode and a first drain electrode, wherein the first gate electrode is electrically connected with the first gate line, the first source electrode is electrically connected with one of the first data line and the second data line, and the first drain electrode is electrically connected with the first pixel electrode; and
each of the plurality of the second sub-pixels comprises a second switch element, the second switch element comprises a second gate electrode, a second source electrode and a second drain electrode, wherein the second gate electrode is electrically connected with the first gate line, the second source electrode is electrically connected with one of the third data line and the fourth data line, and the second drain electrode is electrically connected with the second pixel electrode,
wherein each of the first gate lines is disposed on one side of the first sub-pixel region and the second sub-pixel region.

20. The display panel according to claim 19, wherein the first substrate further comprises a plurality of third sub-pixel regions and a plurality of fourth sub-pixel regions, the third sub-pixel regions and the fourth sub-pixel regions are alternately arranged in the first direction in sequence, the third sub-pixel regions are respectively adjoining to the first sub-pixel regions in the second direction, and the fourth sub-pixel regions are respectively adjoining to the second sub-pixel regions in the second direction, wherein the display panel further comprises:
a plurality of second gate lines disposed on the first substrate and extending along the first direction, wherein each of the second gate lines is disposed between the first sub-pixel region and the third sub-pixel region, and between the second sub-pixel region and the fourth sub-pixel region;
a plurality of second shielding electrodes disposed on the first substrate and extending along the second direction, wherein the second shielding electrodes are disposed in a common boundary between the third sub-pixel region and the fourth sub-pixel region adjacent to each other, and each of the plurality of the second shielding electrodes has the fixed voltage;
a plurality of third color filter patterns disposed respectively in the third sub-pixel regions on the first substrate;
a plurality of fourth color filter patterns disposed respectively in the fourth sub-pixel regions on the first substrate;
a plurality of third sub-pixels disposed respectively in the third sub-pixel regions, wherein each of the plurality of the third sub-pixels comprises:
a third switch element comprising a third gate electrode, a third source electrode and a third drain electrode, wherein the third gate electrode is electrically connected with the second gate line, and the third source electrode is electrically connected with the other one of the first data line and the second data line; and
a third pixel electrode disposed on the third color filter pattern and electrically connected with the third drain electrode, wherein the first data line and the second data line at least partially overlap the first pixel electrode and the third pixel electrode; and
a plurality of fourth sub-pixels disposed respectively in the fourth sub-pixel regions, wherein each of the plurality of the fourth sub-pixels comprises:
a fourth switch element comprising a fourth gate electrode, a fourth source electrode and a fourth drain electrode, wherein the fourth gate electrode is electrically connected with the second gate line, and the fourth source electrode is electrically connected with the other one of the third data line and the fourth data line; and
a fourth pixel electrode disposed on the fourth color filter pattern and electrically connected with the fourth drain electrode, wherein the third data line and the fourth data line at least partially overlap the second pixel electrode and the fourth pixel electrode.

21. The display panel according to claim 20, wherein the first source electrode of the first switch element is electrically connected with the first data line, the second source electrode of the second switch element is electrically connected with the fourth data line, the third source electrode of the third switch element is electrically connected with the second data line, and the fourth source electrode of the fourth switch element is electrically connected with the third data line.

22. The display panel according to claim 20, wherein the first source electrode of the first switch element is electrically connected with the first data line, the second source electrode of the second switch element is electrically connected with the third data line, the third source electrode of the third switch element is electrically connected with the second data line, and the fourth source electrode of the fourth switch element is electrically connected with the fourth data line.

23. The display panel according to claim 1, wherein
each of the plurality of the first sub-pixel regions comprises a first main region and a first sub-region;
each of the plurality of the second sub-pixel regions comprises a second main region and a second sub-region;
each of the plurality of the first sub-pixels comprises:
two first switch elements, each of the first switch elements comprising a first gate electrode, a first source electrode and a first drain electrode, wherein the first gate electrodes are electrically connected with the first gate line, the first source electrodes are electrically connected with the first data line and the second data line respectively; and
two first pixel electrodes disposed on the first color filter pattern and disposed in the first main region and the first sub-region respectively, wherein the first pixel electrodes are electrically connected with the first drain electrodes respectively; and
each of the plurality of the second sub-pixels comprises:
two second switch elements, each of the second switch elements comprising a second gate electrode, a second source electrode and a second drain electrode, wherein the second gate electrodes are electrically connected with the first gate line, and the second source electrodes are electrically connected with the third data line and the fourth data line respectively; and
two second pixel electrodes disposed on the second color filter pattern and disposed in the second main region and the second sub-region respectively, wherein the second pixel electrodes are electrically connected with the second drain electrodes respectively,
wherein each of the first gate lines extends along the first direction and is disposed between the first main region and the first sub-region, and between the second main region and the second sub-region.

24. The display panel according to claim 23, wherein the first substrate further comprises a plurality of third sub-pixel regions and a plurality of fourth sub-pixel regions, the third sub-pixel regions and the fourth sub-pixel regions are alternately arranged in sequence in the first direction, the third sub-pixel regions are adjoining to the first sub-pixel regions in the second direction, and the fourth sub-pixel regions are adjoining to the second sub-pixel regions in the second direction, wherein each of the plurality of the third sub-pixel regions comprises a third main region and a third sub-region, and each of the plurality of the fourth sub-pixel regions comprises a fourth main region and a fourth sub-region, wherein the display panel further comprises:
a plurality of second gate lines disposed on the first substrate and extending along the first direction, wherein each of the second gate lines is disposed between the third main region and the third sub-region, and between the fourth main region and the fourth sub-region;
a plurality of second shielding electrodes disposed on the first substrate and extending along the second direction, wherein the second shielding electrodes are disposed in a common boundary between the third sub-pixel region and the fourth sub-pixel region adjacent to each other, and each of the plurality of the second shielding electrodes has the fixed voltage;
a plurality of third color filter patterns disposed on the first substrate and disposed in the third sub-pixel regions respectively;
a plurality of fourth color filter patterns disposed on the first substrate and disposed in the fourth sub-pixel regions respectively;
a plurality of third sub-pixels disposed respectively in the third sub-pixel regions, wherein each of the plurality of the third sub-pixels comprises:
two third switch elements, each of the third switch elements comprising a third gate electrode, a third source electrode and a third drain electrode, wherein the third gate electrodes are electrically connected with the second gate line, and the third source electrodes are electrically connected with the first data line and the second data line respectively; and
two third pixel electrodes disposed on the third color filter pattern and disposed in the third main region and the third sub-region respectively, wherein the third pixel electrodes are electrically connected with the third drain electrodes respectively, and the first data line and the second data line at least partially overlap the first pixel electrodes and the third pixel electrodes; and
a plurality of fourth sub-pixels disposed respectively in the fourth sub-pixel regions, wherein each of the plurality of the fourth sub-pixels comprise:
two fourth switch elements, each of the fourth switch elements comprising a fourth gate electrode, a fourth source electrode and a fourth drain electrode, wherein the fourth gate electrodes are electrically connected with the second gate line, the fourth source electrodes are electrically connected with the third data line and the fourth data line respectively; and
two fourth pixel electrodes disposed on the fourth color filter pattern and disposed in the fourth main region and the fourth sub-region respectively, wherein the fourth pixel electrodes are electrically connected with the fourth drains respectively, wherein the third data line and the fourth data line at least partially overlap the second pixel electrodes and the fourth pixel electrodes.

25. The display panel according to claim 1, wherein
each of the plurality of the first sub-pixel regions comprises a first main region and a first sub-region;
each of the plurality of the second sub-pixel regions comprises a second main region and a second sub-region;
each of the plurality of the first sub-pixels comprises:
two first switch elements, each of the first switch elements comprising a first gate electrode, a first source electrode and a first drain electrode, wherein the first gate electrodes are electrically connected with the first gate line, and the first source electrodes are electrically connected with one of the first data line and the second data line; and two first pixel electrodes disposed on the first color filter pattern and disposed in the first main region and the first sub-region respectively, wherein the first pixel electrodes are electrically connected with the first drain electrodes respectively; and each of the plurality of the second sub-pixels comprises:

two second switch elements, each of the second switch elements comprising a second gate electrode, a second source electrode and a second drain electrode, wherein the second gate electrodes are electrically connected with the first gate line, and the second source electrodes are electrically connected with one of the third data line and the fourth data line respectively; and two second pixel electrodes disposed on the second color filter pattern and disposed in the second main region and the second sub-region respectively, wherein the second pixel electrodes are electrically connected with the second drain electrodes respectively, wherein each of the first gate lines extends along the first direction and is disposed between the first main region and the first sub-region, and between the second main region and the second sub-region.

26. The display panel according to claim 25, wherein the first substrate further comprises a plurality of third sub-pixel regions and a plurality of fourth sub-pixel regions, the third sub-pixel regions and the fourth sub-pixel regions are alternately arranged in sequence in the first direction, the third sub-pixel regions are adjoining to the first sub-pixel regions in the second direction, and the fourth sub-pixel regions are adjoining to the second sub-pixel regions in the second direction, wherein each of the plurality of the third sub-pixel regions comprises a third main region and a third sub-region, and each of the plurality of the fourth sub-pixel regions comprises a fourth main region and a fourth sub-region, wherein the display panel further comprises:

a plurality of second gate lines disposed on the first substrate and extending along the first direction, wherein each of the second gate lines is disposed between the third main region and the third sub-region, and between the fourth main region and the fourth sub-region;

a plurality of second shielding electrodes disposed on the first substrate and extending along the second direction, wherein the second shielding electrodes are disposed in a common boundary between the third sub-pixel region and the fourth sub-pixel region adjacent to each other, and each of the plurality of the second shielding electrodes has the fixed voltage;

a plurality of third color filter patterns disposed on the first substrate and disposed in the third sub-pixel regions respectively;

a plurality of fourth color filter patterns disposed on the first substrate and disposed in the fourth sub-pixel regions respectively;

a plurality of third sub-pixels disposed respectively in the third sub-pixel regions, wherein each of the plurality of the third sub-pixels comprises:

two third switch elements, each of the third switch elements comprising a third gate electrode, a third source electrode and a third drain electrode, wherein the third gate electrodes are electrically connected with the second gate line, and the third source electrodes are electrically connected with the other one of the first data line and the second data line respectively; and two third pixel electrodes disposed on the third color filter pattern and disposed in the third main region and the third sub-region respectively, wherein the third pixel electrodes are electrically connected with the third drain electrodes respectively, and the first data line and the second data line at least partially overlap the first pixel electrodes and the third pixel electrodes; and a plurality of fourth sub-pixels disposed respectively in the fourth sub-pixel regions, wherein each of the plurality of the fourth sub-pixels comprises:

two fourth switch elements, each of the fourth switch elements comprising a fourth gate electrode, a fourth source electrode and a fourth drain electrode, wherein the fourth gate electrodes are electrically connected with the second gate line, and the fourth source electrodes are electrically connected with the other one of the third data line and the fourth data line respectively; and two fourth pixel electrodes disposed on the fourth color filter pattern and disposed in the fourth main region and the fourth sub-region respectively, wherein the fourth pixel electrodes are electrically connected with the fourth drain electrodes respectively, wherein the third data line and the fourth data line at least partially overlap the second pixel electrodes and the fourth pixel electrodes.

27. The display panel according to claim 24, further comprising:

a plurality of first signal lines extending along the first direction, wherein each of the plurality of the first signal lines is disposed between the first main region and the first sub-region, and each of the plurality of the first signal lines is disposed between the second main region and the second sub-region; and a plurality of second signal lines extending along the first direction, wherein each of the plurality of the second signal lines is disposed between the third main region and the third sub-region, and each of the plurality of the second signal lines is disposed between the fourth main region and the fourth sub-region, wherein each of the plurality of the first sub-pixels further comprises a fifth switch element, the fifth switch element comprises a fifth gate electrode, a fifth source electrode and a fifth drain electrode, wherein the fifth gate electrode is electrically connected with the first signal line, the fifth source electrode is floating, and the fifth drain electrode is electrically connected with one of the first drain electrode;

each of the plurality of the second sub-pixels further comprises a sixth switch element, the sixth switch element comprises a sixth gate electrode, a sixth source electrode and a sixth drain electrode, wherein the sixth gate electrode is electrically connected with the first signal line, the sixth source electrode is floating, and the sixth drain electrode is electrically connected with one of the second drain electrode;

each of the plurality of the third sub-pixels further comprises a seventh switch element, the seventh switch element comprises a seventh gate electrode, a seventh source electrode and a seventh drain electrode, wherein the seventh gate electrode is electrically connected with the second signal line, the seventh source electrode is floating, and the seventh drain electrode is electrically connected with one of the third drain electrode; and each of the plurality of the fourth sub-pixel further comprises an eighth switch element, the eighth switch element comprises an eighth gate electrode, an eighth source electrode and an eighth drain electrode, wherein the eighth gate electrode is electrically connected with the second signal line, the eighth source electrode is floating, and the eighth drain electrode is electrically connected with one of the fourth drain electrode.

28. The display panel according to claim 1, further comprising at least one common line disposed along the first direction on the first substrate, wherein the common line is connected with the first shielding electrodes, and the fixed voltage is a common voltage.

29. The display panel according to claim 1, wherein the first color filter pattern and the second color filter pattern are stacked with each other in the common boundary of the first sub-pixel region and the second sub-pixel region, and the first color filter pattern and the second color filter pattern overlap a portion of the first shielding electrode in the vertical projection direction.

30. A curved display, comprising:

the display panel according to claim 1; and a frame, wherein the display panel is combined with the frame for forming a curved display surface having a curvature.

* * * * *